United States Patent
Jangda et al.

(10) Patent No.: US 9,719,009 B2
(45) Date of Patent: Aug. 1, 2017

(54) OIL RECOVERY PROCESSES AT HIGH SALINITY CARBONATE RESERVOIRS

(71) Applicant: King Fahd University of Petroleum and Minerals, Dhahran (SA)

(72) Inventors: Zaid Zaffar Jangda, Dhahran (SA); Abdullah S. Sultan, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 29 days.

(21) Appl. No.: 14/673,604

(22) Filed: Mar. 30, 2015

(65) Prior Publication Data
US 2016/0289539 A1 Oct. 6, 2016

(51) Int. Cl.
| | |
|---|---|
| *E21B 43/22* | (2006.01) |
| *C09K 8/584* | (2006.01) |
| *E21B 43/20* | (2006.01) |
| *E21B 43/16* | (2006.01) |
| *C09K 8/594* | (2006.01) |

(52) U.S. Cl.
CPC ............ *C09K 8/584* (2013.01); *C09K 8/594* (2013.01); *E21B 43/164* (2013.01); *E21B 43/20* (2013.01); *Y02P 90/70* (2015.11)

(58) Field of Classification Search
CPC ............................ C09K 8/584; E21B 43/164
See application file for complete search history.

(56) References Cited

U.S. PATENT DOCUMENTS

| | | | |
|---|---|---|---|
| 2,875,833 A | 3/1959 | Martin | |
| 3,303,896 A | 2/1967 | Tillotson et al. | |
| 4,271,906 A | 6/1981 | Bousaid et al. | |
| 4,828,029 A * | 5/1989 | Irani | C09K 8/584 166/268 |
| 4,856,589 A | 8/1989 | Kuhlman et al. | |
| 2013/0269932 A1 * | 10/2013 | Dams | C09K 8/035 166/250.01 |

OTHER PUBLICATIONS

DuPont™ Capstone® Fluorosurfactant FS-51, 2012.*
DuPont™ Zonyl® Fluorosurfactants Well Stimulation Additives, 2007.*

* cited by examiner

Primary Examiner — Angela M DiTrani
Assistant Examiner — Andrew H Sue-Ako
(74) Attorney, Agent, or Firm — Oblon, McClelland, Maier & Neustadt, L.L.P.

(57) ABSTRACT

A process for recovering oil from a carbonate reservoir of high salinity, wherein supercritical $CO_2$ floodings are combined with a fluorosurfactant in the tertiary recovery. Embodiments include alternating injection and co-injection schemes of the supercritical $CO_2$ and the fluorosurfactant. A stable fluorosurfactant-$CO_2$ foam that is not susceptible to the harsh conditions of the reservoir (temperature, pressure and salinity) can be successfully generated, leading to a reduction in the mobility of $CO_2$, an increase in the mobility of the reservoir oil, higher contact between the injected fluid with the oil and a better sweep efficiency of the oil.

11 Claims, 26 Drawing Sheets

OIL RECOVERY PROCESSES AT HIGH SALINITY CARBONATE RESERVOIRS

BACKGROUND OF THE INVENTION

Technical Field

The present invention relates to processes and techniques for oil recovery. More specifically, combined supercritical $CO_2$ and surfactant solution injection strategies are deployed in these processes to effectively displace oil from reservoirs of high salinity.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crude oil development and production in global oil reservoirs can include up to three distinct phases: primary, secondary and tertiary (or enhanced) recovery. During primary recovery, reservoir drive comes from a number of natural mechanisms. These include: natural water displacing oil downward into the well, expansion of the natural gas at the top of the reservoir, expansion of gas initially dissolved in the crude oil, and gravity drainage resulting from the movement of oil within the reservoir from the upper to the lower parts where production wells are located. Only about 10% (e.g. 5-15%) of a reservoir's original oil in place is typically produced by the natural mechanisms of primary recovery. Secondary techniques extend a field's productive life after the natural reservoir drive diminishes, generally by injecting external energy in the form of water (e.g. water injection or waterflooding) or gas to increase the reservoir pressure, so that the oil can be artificially displaced and driven to a production wellbore, resulting in the recovery of 20-40% of the original oil in place.

As the global energy demand continues to surge and the amount of easy-to-produce oil (by primary and secondary recoveries) diminishes rapidly, oil producers are investing and searching for methods to increase oil recovery, including the recovery of residual oil from a growing number of mature oil fields that have already been subjected to primary and secondary recoveries. The residual oil is usually heavy: having high viscosity and therefore resulting in low oil mobility.

Techniques in enhanced oil recovery (EOR) offer prospects for ultimately producing 30-60%, or more, of the reservoir's original oil in place. EOR processes attempt increase the recovery factor by focusing on the rock/oil/injectant system (e.g. wettability of reservoir rocks) as well as the interplay of capillary and viscous forces (i.e. to reduce the viscosity and thereby increase the mobility of the oil especially the residual oil). Three major categories of EOR have been found to be commercially of varying degrees: thermal recovery, gas injection (e.g. natural gas, $N_2$ or $CO_2$) and chemical injection (e.g. polymer flooding and microbial injection).

The EOR technique that has attracted the most new market interest is $CO_2$-EOR. In the U.S., $CO_2$ injection has been implemented through the Permian Basin of West Texas and eastern New Mexico, and is now also being pursued at varying extents in other states such as Kansas, Mississippi, Wyoming, Oklahoma, Colorado, Utah, Montana, Alaska and Pennsylvania.

$CO_2$ is effective in recovering oil from a reservoir because it promotes swelling of the oil, reduces the viscosity and vaporizes portions of crude as it is being transported through the porous rock (Shawket Ghedan, 2009, "Global Laboratory Experience of $CO_2$-EOR Flooding", SPE 125581—incorporated herein by reference in its entirety). However, as $CO_2$ is highly mobile, this technique encounters problems of viscous fingering, reservoir heterogeneity and gravity overriding or segregation, as the ability to control the mobility of $CO_2$ is limited (S. I. Bakhtiyarov, A. K. Shakhverdiev, 2007, "Effect of Surfactant on Volume and Pressure of Generated $CO_2$ Gas", SPE 106902; B. Bai, R. B. Grigg, Y. Liu and Z. Zeng, 2005, "Adsorption Kinetics of Surfactant Used in $CO_2$—Foam Flooding Onto Berea Sandstone", SPE 95920; R. B. Grigg, B. Bai, 2005, "Sorption of Surfactant Used in $CO_2$ Flooding onto Five Minerals and Three Porous Media", SPE 93100; John D. Rogers, Reid B. Grigg, October 2001, "A Literature Analysis of the WAG Injectivity Abnormalities in the $CO_2$ Process", SPE Reservoir Evaluation & Engineering, 375-386—each incorporated herein by reference in its entirety).

Attempts to reduce the mobility of $CO_2$ include the injection of $CO_2$ in a supercritical fluid state or as carbonated water, which can also be accompanied by the injection of chemicals such as viscosifiers, surfactants and nanosilica particles for foam formation (Morten Gunnar Aarra, Arne Skauge, Stensbye Solbakken, 2013, "Supercritical $CO_2$ Foam—The Importance of $CO_2$ Density on Foams Performance", SPE-165296-MS; M. M. Kulkarni and D. N. Rao, 2005, "Experimental Investigation of Miscible Secondary Gas Injection", SPE 95975; Jianjia Yu, Di Mo, Ning Liu, Robert Lee, 2013, "The Application of Nanoparticle-Stabilized $CO_2$ Foam for Oil Recovery", SPE 164074; A. A. Espie, 2005, "A New Dawn for $CO_2$ EOR", IPTC 10935; Asghari, K., M. Nasehi Araghi, F. Ahmadloo and P. Nakutnyy, 2009, "Utilization of $CO_2$ for Improving the Performance of Waterflooding in Heavy Oil Recovery," Petroleum Society Journals; Sohrabi, M., M. Riazi, M. Jamiolahmady, S. Ireland, C. Brown, "Mechanisms of Oil Recovery by Carbonated Water Injection", SCA2009-26; R. Farajzadeh, A. Andrianov, and P. L. J. Zitha, 2009, "Foam assisted oil recovery at miscible and immiscible conditions", SPE 126410—each incorporated herein by reference in its entirety).

The use of surfactants in foam EOR is to reduce the mobility of the injected fluid by increasing the viscosity which leads to higher sweep displacement efficiency. The capillary forces are reduced due to reduction interfacial tension by the presence of the surfactant. Using surfactants to control the mobility of $CO_2$ is technically viable, yet the efficiency of the surfactant-$CO_2$ system often decreases sharply during clouding as a result of contact with crude oil, adsorption of surfactants, high salinity formation water and high reservoir temperature (Ingebret Fjelde, John Zuta and Ingrid Hauge, June 2009, "Retention of CO2-Foaming Agents on Chalk: Effects of Surfactant Structure, Temperature, and Residual Oil Saturation", SPE Reservoir Evaluation and Engineering, 419-426; U.S. Pat. No. 4,060,727—each incorporated herein by reference in its entirety). These challenges have been the focus of research at the laboratory core flood and field scale simulation using commercial simulators like CMG-STARS (Guangwei Ren, Hang Zhang and Quoc P. Nguyen, 2011, "Effect of Surfactant Partitioning Between $CO_2$ and Water on $CO_2$ Mobility Control in Hydrocarbon Reservoirs", SPE 145102; Viet Q. Le, Quoc P. Nguyen and Aaron W. Sanders, 2008, "A Novel Foam Concept with $CO_2$ Dissolved Surfactants", SPE 113370; A.

Moradi-Araghi, E. L. Johnson, D. R. Zornes and K. J. Harpole, 1997, "Laboratory Evaluation of Surfactants for $CO_2$—Foam Applications in the South Cowden Unit", SPE 37218—each incorporated herein by reference in its entirety). For example, high crude oil presence can cause destabilizing effects on the $CO_2$ foam (A. Moradi-Araghi, E. L. Johnson, D. R. Zornes and K. J. Harpole, 1997, "Laboratory Evaluation of Surfactants for $CO_2$—Foam Applications in the South Cowden Unit", SPE 37218—each incorporated herein by reference in its entirety). The identification of cost-effective, environmentally friendly materials that dissolve in supercritical $CO_2$ for use in EOR has also posed a great challenge. Supercritical $CO_2$-philes (materials soluble in supercritical $CO_2$) are rare and use of these materials as surfactants was not possible due to the high pressures required to dissolve them (a result of their high molecular weight) and the inability to cost-effectively add a hydrophilic group for solubility in the bulk recovery fluid (water).

From the foregoing, it is evident that there remains an unmet need for a surfactant-$CO_2$ system that works in actual reservoir conditions, despite the globally concerted effort. Most of the efforts attempted hitherto are plagued with deficiencies that restrict their applicability. For example, a majority of the aforementioned surfactants have not been tested in high saline environment. The inability of foam generation or instability of the generated foam means that the problem of $CO_2$ high mobility has not been successfully tackled. Adsorption of the surfactant on the rock material is another factor which reduces the effectiveness of the foam system. Moreover, the number of foam experiments that have been conducted carbonate rocks is very limited; those conducted on long cores are even fewer.

BRIEF SUMMARY OF THE INVENTION

In one aspect of the present invention, there is provided a process for recovering hydrocarbon from a carbonate reservoir. The process comprises injecting the carbonate reservoir with a first solution to recover a first amount of hydrocarbon and injecting the carbonate reservoir with a second solution and a third solution to recover a second amount of hydrocarbon. The second solution comprises an amphoteric fluorosurfactant and the third solution comprises supercritical $CO_2$. The injecting with the second solution and the third solution displaces the second amount of hydrocarbon from the carbonate reservoir by pushing the second amount of hydrocarbon and reducing the viscosity of the second amount of hydrocarbon.

In one embodiment, the first solution is an aqueous solution having a salinity of 20,000 ppm to 200,000 ppm.

In one embodiment, the first solution is natural sea water having a salinity of 55,000-60,000 ppm.

In one embodiment, the second solution is an aqueous solution having a fluorosurfactant concentration of 0.05-0.3 vol. % and a salinity of 20,000 ppm to 200,000 ppm.

In one embodiment, the second solution is an aqueous solution having a fluorosurfactant concentration of 0.1-0.2 vol. % and a salinity of 57,670 ppm. In one embodiment, the fluorosurfactant is amphoteric and comprises a hydrophobic chain having no more than 12 carbon atoms.

In one embodiment, the second solution is substantially free of a non-fluorinated cosurfactant compound.

In one embodiment, the third solution has a supercritical $CO_2$ of at least 70 vol. % and a salinity of no higher than 1000 ppm.

In one embodiment, the second solution and the third solution are injected alternately in a plurality of cycles, each cycle comprising one discontinuous fluorosurfactant slug and one discontinuous supercritical $CO_2$ slug, each discontinuous slug comprising 0.1 to 2.5 pore volumes of the second solution or the third solution.

In another embodiment, the second solution and the third solution are injected simultaneously in one continuous fluorosurfactant slug and one continuous supercritical $CO_2$ slug, each continuous slug comprising 1.5 to 5.0 pore volumes of the second solution or the third solution.

In one embodiment, the discontinuous surfactant slug is injected before the discontinuous supercritical $CO_2$ slug in each of the plurality of cycles at a volume ratio of x:y, where x and y are independently an integer of 1 to 9.

In one embodiment, the discontinuous surfactant slug is injected before the discontinuous supercritical $CO_2$ slug in each of the plurality of cycles at a volume ratio of 1:3.

In one embodiment, the injecting of the second solution and the third solution reduces viscosity of the oil by 65-80%.

In one embodiment, the process recovers at least 50% of the original oil in place in the carbonate reservoir.

In one embodiment, the injecting with the second saline solution and the third solution recovers at least 30% of the oil left in the carbonate reservoir after the injecting with the first saline solution.

In one embodiment, the injecting with the second saline solution and the third solution provides at least 15% incremental oil recovery after the injecting with the first saline solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
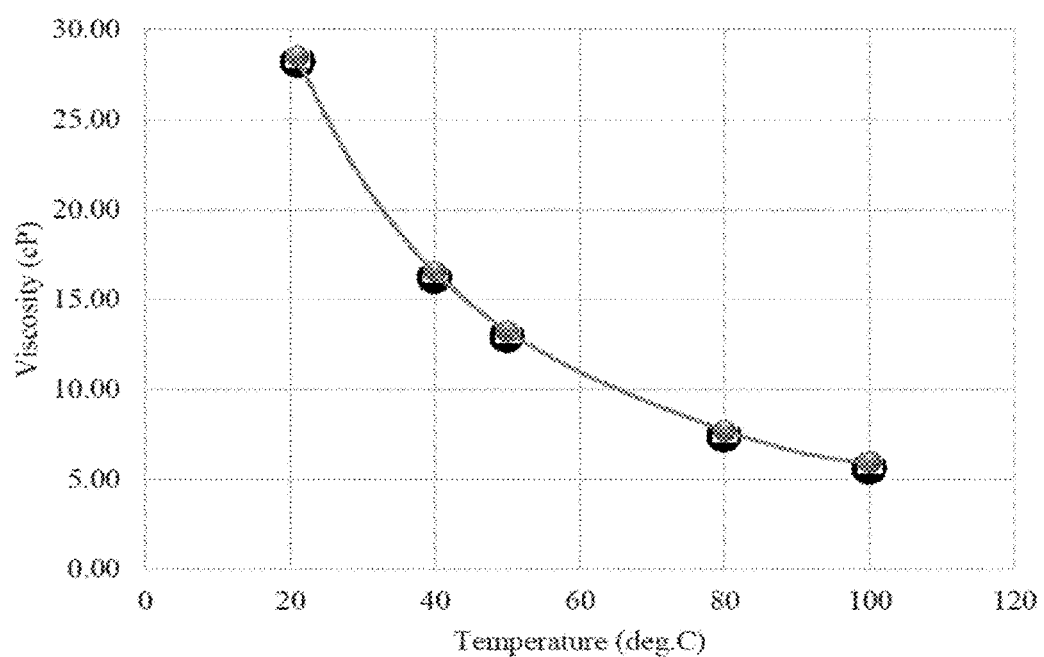
FIG. 1 is a curve showing measurements of the viscosity of the Uthmaniya dead oil as a function of temperature.

Referring now to the drawings, wherein like reference numerals designate identical or corresponding parts throughout the several views.

Reference through the specification to "one embodiment", "an embodiment", "an alternative embodiment", "certain embodiments", "other embodiments", "one or more embodiments", "at least one embodiment" means that a particular feature, structure, or characteristic described in connection with an embodiment is included in at least one embodiment of the subject matter disclosed. Thus, the appearance of the phrases "in one embodiment", "in an embodiment", "in an alternative embodiment", "in certain embodiments", "in other embodiments", "in at least one embodiment" and "in one or more embodiments" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, terms such as "first", "second" and "third" are used to describe to various elements and features, such as solutions injected into the petroleum reservoir and recovered hydrocarbon, only for purposes of clarity and discriminating one element or feature from another element or feature. These terms are not intended as limiting the elements and features to a particular order of their occurrence. Therefore, the elements and features are not limited to these terms.

In the present invention, there is provided a process for recovering hydrocarbon (primarily crude oil but not excluding natural gas) from a petroleum reservoir. The process is designed to supplement natural or primary recovery and secondary recovery, and includes an initial flooding of the reservoir with a saline solution, followed by injection of a fluorosurfactant solution and supercritical $CO_2$ solution into the reservoir. The injected fluorosurfactant solution and supercritical $CO_2$ solution form a stable foam inside the reservoir that efficiently sweeps or pushes to displace oil and move the displaced oil to a nearby production well. Embodiments of the present invention include different alternating injection strategies and co-injection strategies of the fluorosurfactant solution and the supercritical $CO_2$ solution, where the number of slugs or cycles, slug sizes and ratios are varied.

For purposes of the present invention, the term "slug" refers to a volume of a saline solution, supercritical $CO_2$ solution, a fluorosurfactant solution or mixtures thereof that can be injected or pumped into a reservoir to displace oil from the reservoir and drive the displaced oil drive it to a production wellbore. The volume of a slug is usually measured as pore volume (PV), which is a known or measured hydrocarbon reservoir pore volume (HCPV).

The saline solution used in the process is an aqueous solution having a salinity of at least 20,000 ppm, preferably 20,000-200,000 ppm, more preferably 30,000-150,000 ppm, even more preferably 40,000-120,000 ppm, even more preferably 50,000-100,000 ppm, more preferably 55,000-60,000 ppm. Minerals contained in the saline solution include but are not limited to chloride, sodium, sulfate, magnesium, calcium, potassium, bicarbonate, carbonate, bromide, boron, strontium and fluoride. The saline solution may be natural sea water or an artificially prepared brine (an aqueous solution of salts). In some embodiments, when the saline solution is natural sea water, the sea water may further contain microbial components and other organic pollutants that can be optionally removed prior to the oil recovery process.

As used herein, the term "fluorosurfactant" or "fluorinated surfactant" refers to a synthetic organofluorine chemical compound having multiple fluorine atoms. The fluorosurfactant in the fluorosurfactant solution injected into the reservoir can be but is not limited to perfluoro-, amine oxide-, alkyl amine oxide-, telomer-, telomer iodide-based, and has a chain or a "hydrophobic tail" that contains no more than 12 carbon atoms, for example, $C_8$-$C_{12}$, $C_6$-$C_8$. In one embodiment, the fluorosurfactant is amino oxide-based. The fluorosurfactant can also be cationic, anionic or amphoteric. In one embodiment, the fluorosurfactant is amphoteric, having one anionic functional group and one cationic group. The fluorosurfactant solution is prepared by dissolving the fluorosurfactant solids in the same saline solution previously described to a final concentration of 0.05-0.5 vol. %, preferably 0.05-0.3 vol. %, more preferably 0.1-0.2 vol. %. In one embodiment, the fluorosurfactant solution has a fluorosurfactant concentration of 0.15 vol. %. The salinity (in ppm) of the fluorosurfactant solution is reduced by no more than 1.0% compared to salinity of the base saline solution as defined herein, preferably no more than 0.5%. The fluorosurfactant molecule exhibits excellent thermal stability of up to 200° C. without breaking down into perfluorooctanoic acid (PFOA), which is a temperature that is 1.5 to 2 times higher than the actual reservoir temperature during the recovery process. Furthermore, the prepared fluorosurfactant solution is substantially free of a cosurfactant, which can be any second surfactant that is non-ionic and non-fluorine containing such as alcohols and ethers.

The effects of the fluorosurfactant include but are not limited to a reduction in the mobility and sequestration of the injected supercritical $CO_2$ leading to the generation of a stable, dense fluorosurfactant-$CO_2$ foam with good contact, excellent vertical and areal sweep efficiency of the oil inside the reservoir, as well as a reduction in the viscosity or increase in the mobility of the oil. The latter can be determined by interfacial surface tension (IFT) measurements of oil drops (in mN/m). In some embodiments, the injection of the fluorosurfactant solution, alone or in combination with the supercritical $CO_2$, results in a 65-80% reduction in the interfacial surface tension of the crude oil, preferably 70-80%, more preferably 75-80%.

For purposes of the present invention, the term "supercritical $CO_2$" refers to carbon dioxide that is held at or above its critical point (critical temperature=304.25 K or 31.1° C. and critical pressure=72.9 atm or 1071 psi) and is in a supercritical fluid or dense-phase state. Supercritical $CO_2$ adopts properties between a gas and a liquid, having a low viscosity and expanding to fill its container like a gas but with a density of a liquid. As used herein, the "supercritical $CO_2$ solution" that is introduced into a reservoir consists essentially of $CO_2$ in the supercritical fluid state and is substantially free of salts and minerals. The supercritical $CO_2$ solution can be pure supercritical $CO_2$ fluid or the fluid diluted using water as a solvent to a final supercritical $CO_2$ concentration of at least 70 vol. %, preferably 75-99.9 vol. %, more preferably 80-99.9 vol. %, even more preferably 90-99.9 vol. %. The salinity of the supercritical $CO_2$ solution is no higher than 1000 ppm. In some embodiments, although the natural reservoir conditions such as pressure (including both overburden pressure and pressure within the reservoir) and temperature usually suffice to induce a supercritical fluid state for $CO_2$ in situ, the preparation of the supercritical $CO_2$ is conducted ex situ prior to the injection.

As used herein, the term "overburden pressure", "lithostatic pressure", "confining pressure", "pore pressure" or "vertical stress", refers to the pressure or stress caused by the weight of rocks above the formation pressing down on the rocks below. Usually, the overburden pressure is greater than the pressure within a reservoir a pressure differential of at least 500 psi is maintained between the two locations.

While this process can be applied to both sandstone (siliciclastic) and carbonate reservoirs, the advantages of the process can be best manifested when used on a high salinity carbonate reservoir for reasons detailed below. The process is also not limited by the porosity and the permeability of a reservoir.

As known in the art, a reduction in salinity values by waterflooding can increase oil production for certain reservoirs. However, this oil production increase can be achieved only if the reservoir contains clay and water (connate water) with a salinity of 5000 ppm and lower.

For purposes of the present invention, the term "water injection" or "waterflooding" refers to a method of secondary recovery in which water is injected into a petroleum reservoir to displace mobile oil. The water injected increases pressure within the reservoir, replenishing the natural reservoir pressure that has been previously depleted in primary recovery, and physically sweeps the displaced mobile oil to the adjacent production wells. Generally, the water used in a waterflooding process is taken from nearby water sources, which is usually either natural sea water or produced water.

For purposes of the present invention, the term "connate water" or "connate fluid" refers to the natural brine occupying or trapped within pore spaces of the sedimentary rocks at an oil reservoir. Connate water is usually at equilibrium with the minerals in the formation. The process described herein is effective in recovering oil from reservoirs having connate water salinity as high as >200,000 ppm.

In the process, the reservoir is injected with 1-3 pore volumes of the saline solution to recover an initial amount of hydrocarbon. This initial amount or recovery factor is no more than 45% of the original oil in place, for example 15-45%, preferably 20-45%, 25-45%, more preferably 30-40%. As used herein, the "recovery factor" refers to the volume percentage of the hydrocarbon recovered or produced based on the original oil in place. After introducing the saline solution into the reservoir, the reservoir is then injected with the fluorosurfactant solution and the supercritical $CO_2$ solution. The total amount of the fluorosurfactant solution and the total amount of the supercritical $CO_2$ introduced into the reservoir each ranges from 1.5-5.0 pore volumes, preferably 2.0-5.0 pore volumes, more preferably 2.5-5.0 pore volumes.

In some embodiments, the fluorosurfactant solution and the supercritical $CO_2$ solution are injected in multiple cycles, each cycle alternating between one discontinuous fluorosurfactant slug and one discontinuous supercritical $CO_2$ slug. In one embodiment, the discontinuous fluorosurfactant slug precedes the discontinuous supercritical $CO_2$ slug in each cycle. The number of cycles is 2-10, preferably 2-8, more preferably 2-5. Slug sizes or slug volumes, which are balanced with the number of cycles and the total amount of the injected solutions, are ranged from 0.1-2.5 pore volumes, preferably 0.1-1.5 pore volumes, more preferably 0.1-1.0 pore volumes, even more preferably 0.125-0.75 pore volumes. In one embodiment, the slug sizes (discontinuous fluorosurfactant slug vs. discontinuous supercritical $CO_2$ slug) are maintained equal in all cycles. In one embodiment the size of a discontinuous fluorosurfactant slug is greater than a discontinuous supercritical $CO_2$ slug with a discontinuous fluorosurfactant slug/discontinuous supercritical $CO_2$ slug volume ratio of 2:1 to 9:1, preferably 2:1 to 5:1, more preferably 2:1 to 4:1. In one embodiment the discontinuous fluorosurfactant slug/discontinuous supercritical $CO_2$ slug volume ratio is 3:1. In another embodiment the size of a discontinuous fluorosurfactant slug is less than a discontinuous supercritical $CO_2$ slug with a discontinuous fluorosurfactant slug/discontinuous supercritical $CO_2$ slug volume ratio of 1:2 to 1:9, preferably 1:2 to 1:5, more preferably 1:2 to 1:4. In one embodiment the discontinuous fluorosurfactant slug/discontinuous supercritical $CO_2$ slug volume ratio is 1:3.

Flow rates or injection rates are kept low for all types of solutions (i.e. saline solution, fluorosurfactant solution and supercritical $CO_2$ solution) to allow for maximum contact between the injected solutions and the oil and rocks. Slugs are injected at flow rates that are no higher than 100 L/s or 0.1 m³/s, preferably 5-75 L/s, more preferably 10-50 L/s, even more preferably 20-40 L/s for the alternating injection scheme and 10-20 L/s for the co-injection scheme.

In an alternative embodiment, the fluorosurfactant solution and the supercritical $CO_2$ solution are injected simultaneously in multiple discontinuous fluorosurfactant slugs and discontinuous supercritical $CO_2$ slugs as described above.

In another alternative embodiment, the fluorosurfactant solution and the supercritical $CO_2$ solution are injected simultaneously in one continuous fluorosurfactant slug and one continuous supercritical $CO_2$ slug. The continuous slug sizes each range from 1.5-5.0 pore volumes, preferably 2.0-5.0 pore volumes, more preferably 2.5-5.0 pore volumes.

The injection of the fluorosurfactant solution and the supercritical $CO_2$ solution into the reservoir after the saline solution injection, whether by alternating injection or co-injection, recovers a second amount of hydrocarbon with a recovery factor of 15-40%, preferably 20-40%, more preferably 24-35%, thereby extending the total recovery factor of the process to at least 50%, preferably 50-85%, more preferably 50-80%, even more preferably 50-75%, most preferably 50-70%. The injection of the fluorosurfactant solution and the supercritical $CO_2$ solution recovers at least 30% of the oil left in the carbonate reservoir after the injecting with the saline solution, preferably 30-60%, more preferably 30-55%, even more preferably 32-53%.

Another alternative embodiment of the present invention pertains to the fluorosurfactant solution being prepared using supercritical $CO_2$ as a solvent at previously defined fluorosurfactant concentrations. In that way, a reservoir can be injected with a fluorosurfactant-supercritical $CO_2$ solution in either one continuous slug or multiple discontinuous slugs.

In certain embodiments, each injection slug and/or cycle (i.e. saline solution, fluorosurfactant solution and supercritical $CO_2$ solution) is immediately followed by an incubation period to allow chemical and/or physical reactions between the injected solutions, between the injected solutions and oil in the reservoir, and between the injected solutions and reservoir rocks. Such incubation periods can range between 10 min and 4 h, preferably 10 min to 2 h, more preferably 10 min to 1 h, even more preferably 10 min to 30 min. In other embodiments, the injection slugs and cycles are carried out continuously with no incubation or interval periods between them.

In some embodiments, to cost-effectively ensure a maximum amount of oil can be recovered, a second round of saline solution injection ensues the fluorosurfactant and supercritical $CO_2$ injections. The recovery factor of this secondary saline solution injection is no more than 10%.

The present invention is further illustrated by the following examples of core-flooding experiments that simulate oil recovery processes at actual high salinity carbonate reservoirs. These examples are presented for illustrative purposes only and are not intended as limiting the scope of the invention which is defined by the appended claims.

EXAMPLES

Specifically designed core-flooding experiments were performed in the present disclosure to help understand the complex phenomena occurring in a hydrocarbon reservoir as a result of rock and fluid interaction in the harsh subsurface conditions. Core-flooding experiments provide the nearest depiction of an actual reservoir that can be achieved on a laboratory scale. The actual environment present under thousands of feet of rock is created as part of a process that has been going on for millions of years, which is impossible to reproduce in the laboratory. However, the equipment and resources available allowed the design of the experiments at conditions that are as closely similar to an actual reservoir as possible. Thus the results can be up-scaled and with the help of proper simulation, a real field performance can be predicted.

An experimental core-flood setup was used to conduct flow through the prepared core samples. The set-up is composed of fluid injection pumps, fluid accumulators, absolute and differential pressure transducers, temperature transducer, core holder, back pressure regulator, overburden pressure pump, pressure multiplier, data acquisition system and an oven. Control and safety valves, tubing, and fittings are integral part of the setup. This equipment was used in conducting tests to determine the efficiency of the $CO_2$-surfactant system in improving oil recovery. The flooding system was integrated with a data acquisition system to record all data generated during the flooding test. A brief description of all the materials and the equipment as well as the detailed procedure followed in the experiments is described below.

Example 1

Materials

Core Samples

Indiana Limestone cores of 12" length and 1.5" diameter were used in all the experiments. The core samples were procured form Kocurek Industries (USA). The supplier specified porosity and permeability values were 19% and 70 and respectively.

Salts

Five different salts were needed to prepare both the synthetic formation and injection brines. These salts were Sodium Chloride (NaCl), Sodium Hydroxide (NaOH), Sodium carbonate ($Na_2CO_3$), Calcium Chloride ($CaCl_2$) and Magnesium Chloride ($MgCl_2$).

Brines

Two types of brines were required for the experiments: Formation brine to saturate the core initially and injection brine for water-flooding. The concentrations of the brines resemble Saudi reservoir connate water and sea water for saturation and injection respectively. The brines were stirred and heated for 48 hours prior to usage in the experiments. Table 1 shows the concentration of the two brine solutions. TDS indicates the total dissolved solids (TDS) of a solution, i.e. the total concentration of dissolved solids in a solution

TABLE 1

Brine concentrations.
Brine Concentrations (ppm)

| Ions | Connate Water | Sea Water |
| --- | --- | --- |
| Sodium | 59,491 | 18,300 |
| Calcium | 19,040 | 650 |
| Magnesium | 2,439 | 2,110 |
| Sulfate | 350 | 4,290 |

TABLE 1-continued

Brine concentrations.
Brine Concentrations (ppm)

| Ions | Connate Water | Sea Water |
| --- | --- | --- |
| Bicarbonate | 354 | 120 |
| TDS | 213,734 | 57,670 |

Oil

Uthmaniya Dead Oil (Saudi Crude) was used in the core-flooding experiments. The oil was filtered using 7 micron filter before using it for the experiments. The API gravity of the oil was 30.1° at room conditions, while the viscosity which is a function of temperature, followed the trend shown in FIG. 1.

Surfactants

The amphoteric amine oxide-based fluoro-surfactant was supplied by DuPont in ample quantity for the various experiments. The non-fluorinated surfactant which was used in the last experiment for comparison was a hydrocarbon surfactant (Ethomeen). The surfactant solutions were prepared by adding surfactant at a concentration of 0.15% (vol.) in the injection brine.

$CO_2$

Industrial Grade $CO_2$ was obtained in sufficient quantity in the form of gas cylinders. The $CO_2$ was then transferred into the cells in the core flooding system.

Toluene

Toluene was used to clean the entire system before each experiment. Being a good solvent of oil, toluene provided good cleaning of all the lines containing any traces of oil.

Example 2

Equipment

Core-Flooding Experimental Setup

Figure 2:
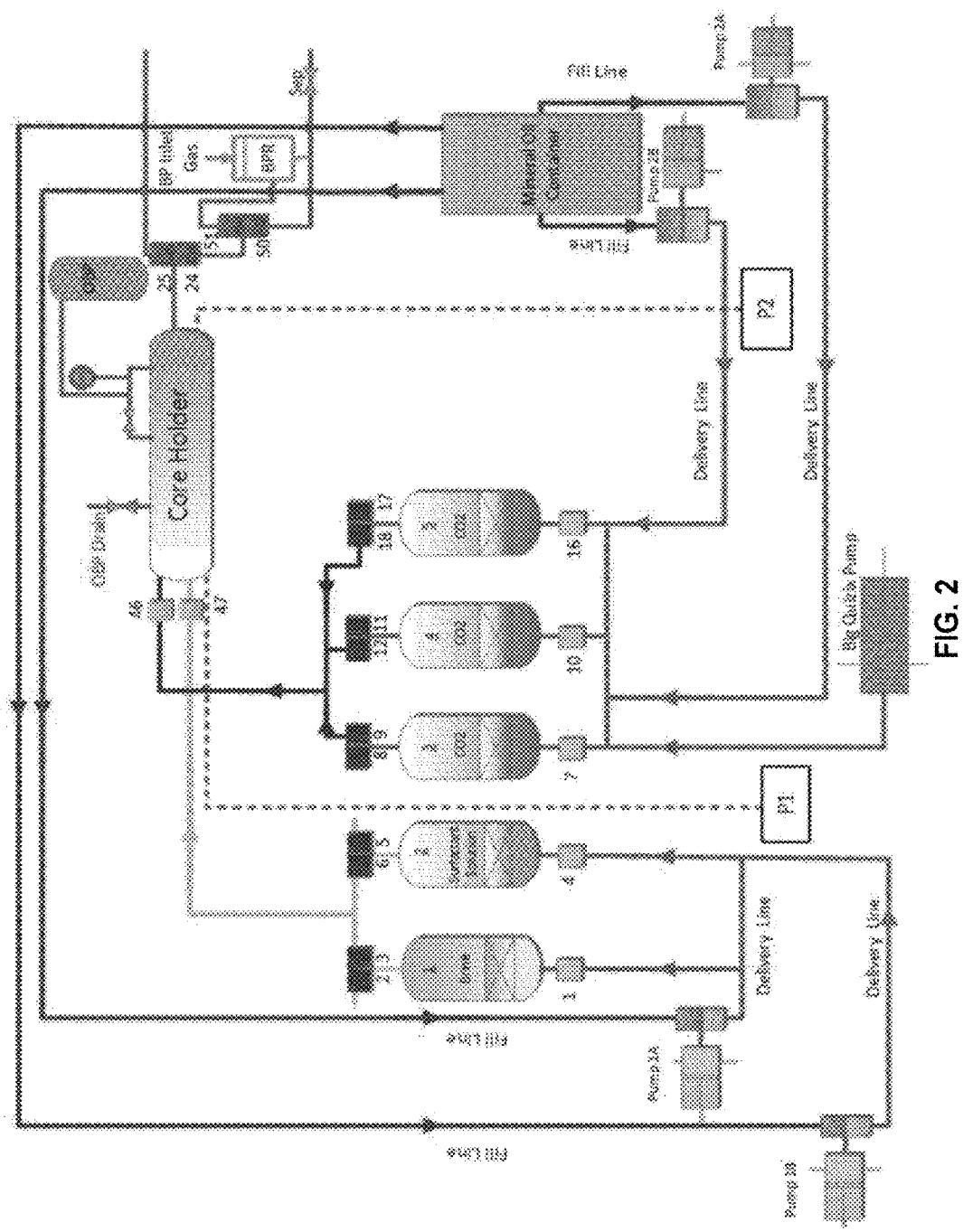
FIG. 2 is a schematic diagram of the $CO_2$-surfactant core-flooding experimental setup.
Figure 3A:
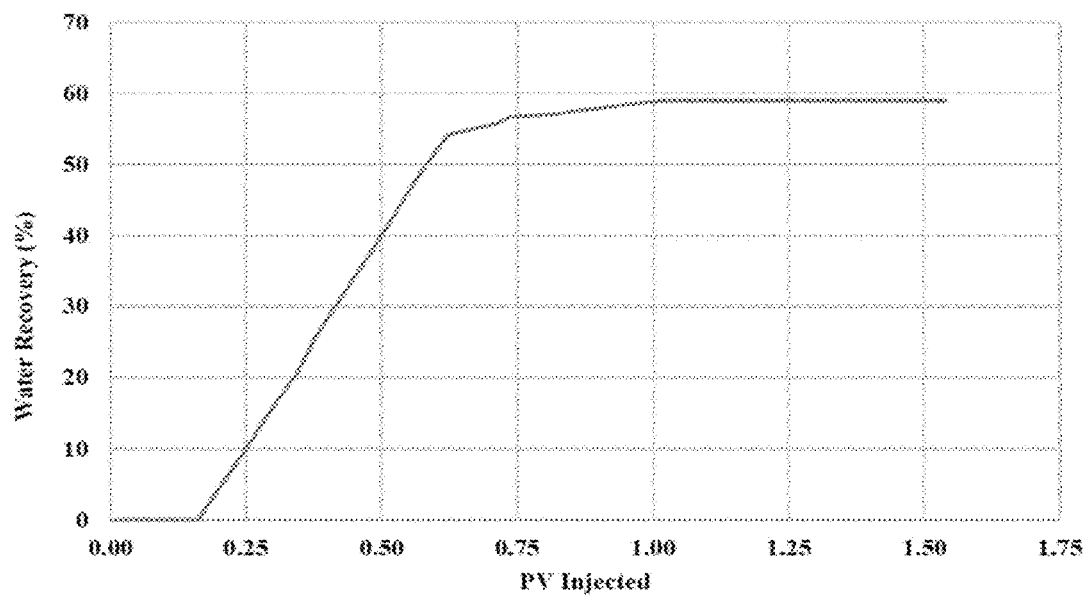
FIG. 3A is an oil saturation curve of Experiment 1.
Figure 3B:
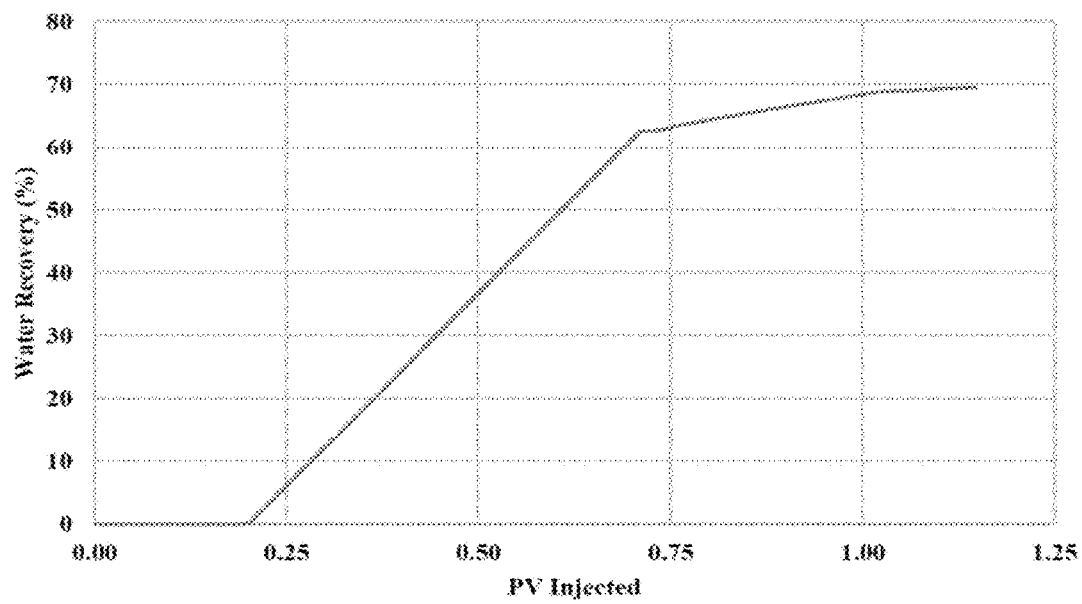
FIG. 3B is an oil saturation curve of Experiment 2.
Figure 3C:
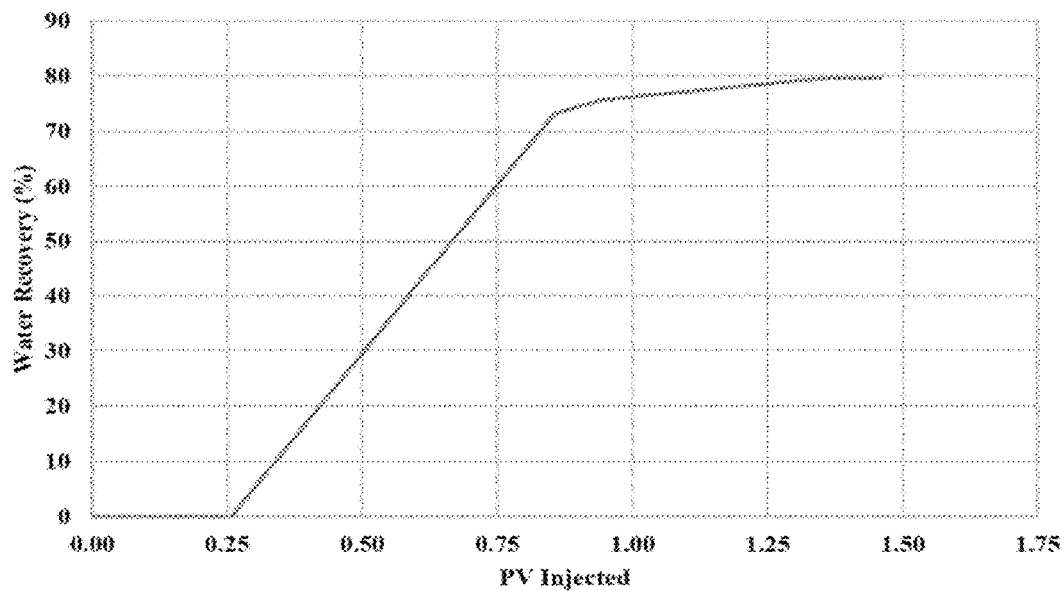
FIG. 3C is an oil saturation curve of Experiment 3.
Figure 3D:
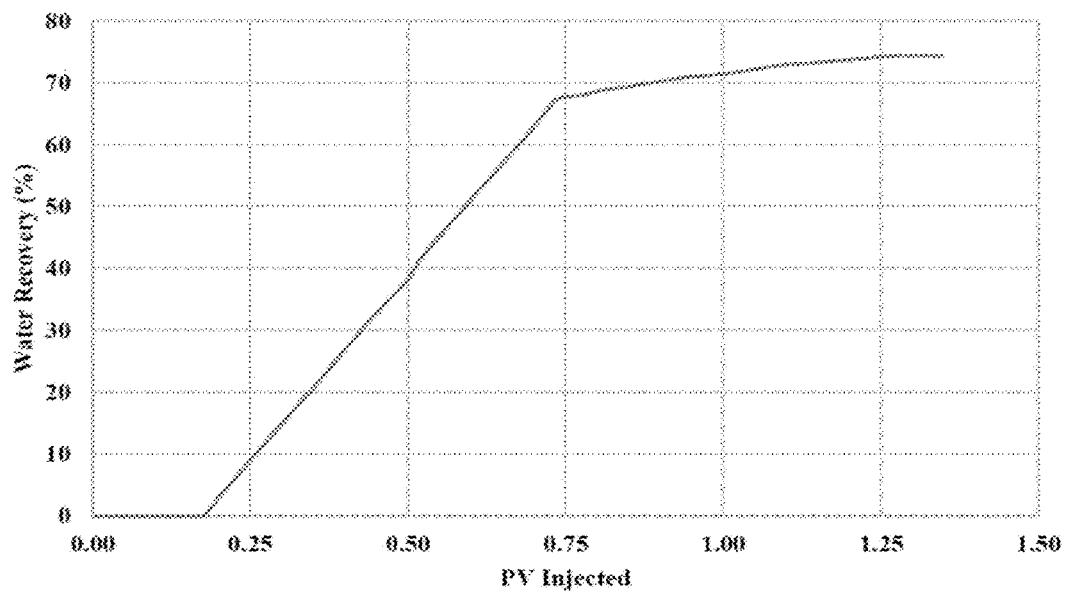
FIG. 3D is an oil saturation curve of Experiment 4.
Figure 3E:
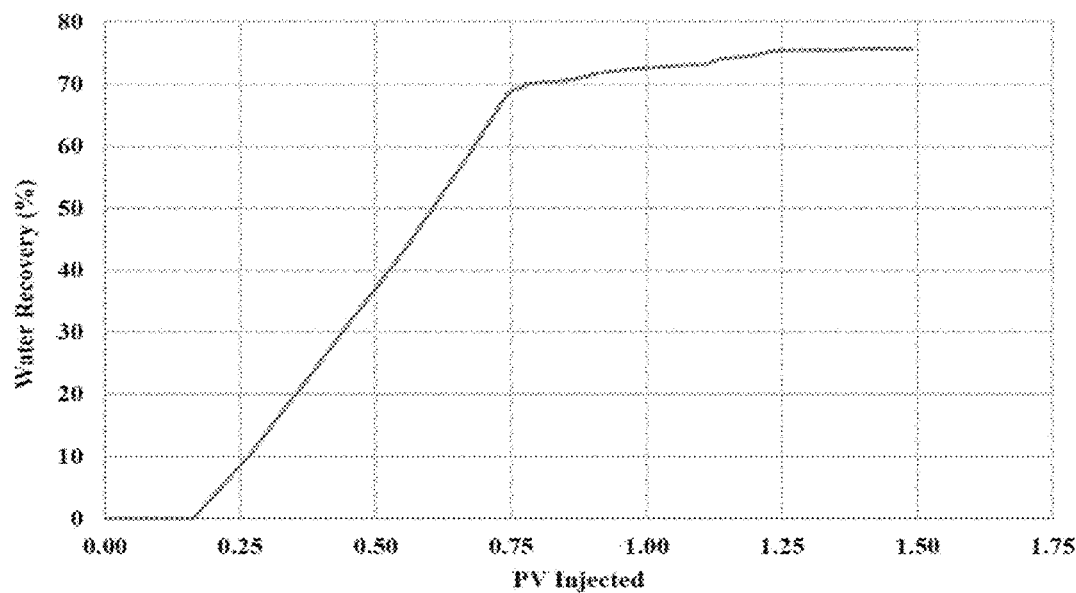
FIG. 3E is an oil saturation curve of Experiment 5.
Figure 3F:
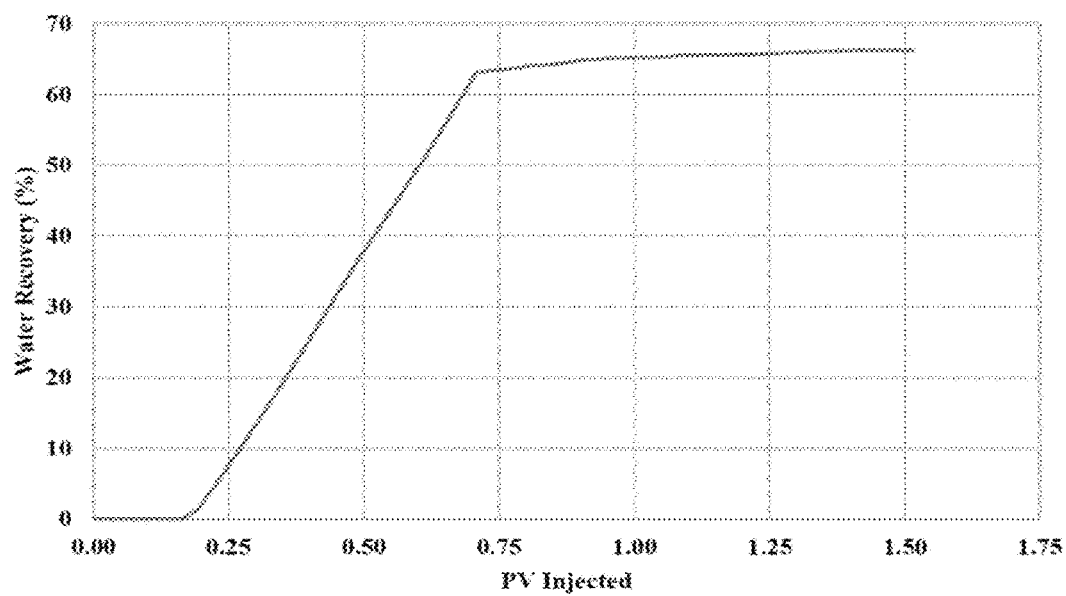
FIG. 3F is an oil saturation curve of Experiment 6.

The core-flooding system used herein is basically a reservoir condition condensate depletion system that was modified to suit the required specifications. The schematic of the core-flooding experimental system is shown in FIG. 2. The system includes an oven, five floating piston fluid cylinders of various volumes, Quizix pumping system, back pressure regulator and the core holder. The components of the flow, control and measurement systems are installed on the ends of the oven, on its roof, as well as within the oven itself. The system includes 72 air operated solenoid valves that are controlled by a software program on a dedicated computer. The flow control system components are all inside the oven. All the pressure transducers and Quizix pump controllers are external to the oven. The system is hooked up to an automatic data logging system which works with the software to record all the data during the experiments in a Microsoft Excel workbook. A brief description of the main components of the system is given below.

Pumps

Quizix Pumping System: The pumping system is made up of six computer controlled positive displacement Quizix pumps. These are very robust precision pumps and are capable of injecting fluids at high temperature and pressure into the core at various predetermined flow rates. Each pump has a separate cylinder, since two pump cylinders are required for continuous flow. The pump cylinders are controlled by a controller for automatic operation. Normally, one cylinder injects fluid into the core while the other is charged or filled through a return line. The system is purposely designed in such a way that the receiving cylinder operates at a slightly higher rate than the delivering cylinder. The objective is that the receiving cylinder is ready to take over to inject fluid into the core prior to the emptying of the delivering cylinder. The pumping system can be used in 3 or 5 pump recirculation modes. In a 3-pump mode, two pumps are used for delivering fluids (liquid and gas) into the core while the third pump acts as a servo pump or back pressure regulator to maintain desired pressure in the system. In a 5-pump recirculation mode, four pumps are used for delivering fluids (liquid and gas) into the core while the fifth pump acts as a servo pump. The sixth pump is employed as a standby pump, which can be used in case of the failure of the fifth pump. The Quizix pumping system is placed in the oven to maintain reservoir conditions of temperature and pressure. The Quizix pumping system window displays all the pumps with operating parameters such as pressures and flow rates, and the user can change these parameters whenever required.

Overburden Pressure (OBP) Pump: A high-pressure syringe pump (ISCO 100D) was used to apply and maintain required overburden pressure (OBP) on the core holder.

External Pumps: Two pumps were used externally in the core flooding experiments. An Eldex pump was used to inject formation brine to build up the pressure and a positive displacement ISCO pump to inject oil in to the core to displace the formation water and saturate the core with oil.

Auxiliary Accessories

Five high-pressure transfer cells of various volumes were incorporated in the experimental setup to store and inject the fluids. Two of them were 1-liter cells to contain the injection brine and the surfactant solution, while the other three cells (two 2-liter cells and one 3-liter cell) all contained $CO_2$. All the cells were located inside the oven to main desired temperature of fluids. Another high pressure titanium cell acquired through Vinci Technologies was connected to the system by an external valve. This cell contained the oil to be injected into the core through the ISCO pump. The differential pressure across the core was measured using two differential pressure transducers, one was low range (50 psig) and the other was high range (500 psig). These transducers have high resolution and automatically switch from low to high during the experiment depending on the differential pressure developed in the core. The inlet and outlet core pressures are monitored by precision Quartzdyne pressure transducers that give accurate absolute pressure. During the experiment the core was fitted in to a stainless steel hassler type core holder manufactured by Core Laboratories. It could accommodate up to 2 ft. long core and the maximum working pressure of the core holder was 7500 psig.

Back Pressure Regulator: A dome shaped back pressure regulator was employed to apply and control the back pressure. Nitrogen was used as a medium for back pressure application.

Computerized Tomography (CT) Scanner: Toshiba Medical CT Scanner was used to perform CT scans of the cores. It could generate CT data for the cores with a minimum slice thickness of 1 mm.

Digital Height Gauge: To measure the core dimensions, a digital height gauge (Mitutoyo 192-605) was used. This gauge provided accurate length and diameter measurements of the cores.

Analytical Weight Balance: A high accuracy analytical weight balance (Sartorius Cubis® Precision Balance MSE5203S-000-DE) was used to measure the weight of the cores, both dry and wet, and also for the measurements of the salts during brine preparation.

IFT Equipment: The interfacial tension (IFT) between the injected brine and oil and the surfactant solution and oil was measured using IFT 700 equipment manufactured by Vinci Technologies. This machine was designed to perform experiments at high pressure (up to 10000 psi) and high temperature (up to 200° C.) and could measure IFT values between 0.1 to 72 mN/m. A drop of oil was created from a calibrated capillary into the bulk fluid (injection brine or surfactant solution) at the experimental conditions, in a viewing chamber which had a capacity of 20 cc. Then, using rising drop method (since the density of oil was less than each of the bulk fluids), a camera connected to the computer recorded the shape of the drop and solved the Laplace equation to provide the interfacial tension values. The accessories equipped with the main equipment were two manual pumps for the sample fluids (bulk and drop fluids), Peltier Thermostat (PT100) temperature sensor, electric heater, a control panel with a temperature regulator, which enables to set the temperature of the system and one pressure indicator. The video system to view the drop and display it on the computer screen consisted of a CCD color camera 1.4M Pixel, a macro zoom lens and an LED for lighting. A computer with the software installed was connected to the system to display and save the results.

Density Meter: In order to measure the IFT, the density of the fluids at the desired condition is required. These values were obtained using the High Pressure Density meter (DMA HP) manufactured by Anton Paar. This equipment was designed to measure the density of liquids and gases under high pressures (up to 10,000 psi) and high temperatures (up to 200° C.). In order to get these measurements the DMA HP cell formed one part of the complete setup. This setup had to be adopted to the particular requirements of each individual application. Temperature control of the DMA HP was carried with an integrated Peltier thermostat. To display the measuring parameters, DMA HP was connected to a master instrument (DMA 4500). The density is measured based on the oscillating U-tube method. The DMA HP measures the period of harmonic oscillation of the built-in U-tube which contains the sample. The period of oscillation is converted into the density of the filled-in sample by the master instrument (DMA 4500).

Example 3

Experimental Plan

A number of experiments were planned in which the parameters were varied to accommodate the effect of various factors on the increase in oil recovery. Three injection strategies were considered:
1. $CO_2$ Flooding—Base case.
2. Alternate Surfactant and $CO_2$ Flooding—Slugs of different ratios of surfactant solution and $CO_2$ were injected alternatively in subsequent experiments.
3. Continuous Surfactant and $CO_2$ Flooding—Surfactant solution and $CO_2$ was injected simultaneously.

The experiments were designed to depict reservoir conditions, thus some of the parameters were kept constant. These include:
Temperature: 90° C.
Pressure: 2500 psi (overburden pressure) or 1800 psi (backpressure)
Crude Oil: Uthmaniya dead oil (30.1° API)
Core: Indiana Limestone 12"×1.5".
Brine Salinity: Connate Water=213,734 TDS; Injection Brine=57,670 TDS
Oil Soak Period: 5 days (aging time)
Injection Flow Rates: Oil=0.25 cc/min; Water=0.5 cc/min; Surfactant solution=0.3 cc/min; $CO_2$=0.3 cc/min; For co-injection experiments, Surfactant solution=0.15 cc/min and $CO_2$=0.15 cc/min.
Surfactant Concentration: 0.15% (vol.)
The parameters that were varied to find the optimum strategy were:
Surfactant Type: Fluoro-Surfactant and Ethomeen surfactant (hydrocarbon).
Injection Volume (slug size):
Experiment 2—Equal Surfactant solution and $CO_2$ slugs (2.5 PV);
Experiment 3—Smaller surfactant solution, larger $CO_2$ slugs (2.5 PV);
Experiment 4—Larger surfactant solution, smaller $CO_2$ slugs (2.5 PV); and
Experiments 5 and 6—Surfactant+$CO_2$ (2.5 PV)

Example 4

Core-Flooding Experimental Procedure

To carry out the experiments a detailed procedure was devised which is detailed as under:
Measurement of Core Properties
Firstly, core dimensions were measured, i.e. dry weight, length, diameter and bulk volume. These measurements were required for the bulk volume, pore volume and porosity calculations.
Core Saturation
Core was then evacuated and saturated with synthetic formation brine in a high pressure cell at 1800 psi for up to 48 hours.
CT Scan of Cores
For some of the experiments the cores were CT scanned both before and after saturation with the connate water. The CT numbers obtained were used to estimate porosity using the formula (Siddiqui, S. and Khamees, A. A., 2005, "Data Visualization Challenges for Displaying Laboratory Core and Flow Data in Three-Dimensions", SPE 106334 presented at SPE Technical Symposium of Saudi Arabia Section, Dhahran, Saudi Arabia, 14-16 May—incorporated herein by reference its entirety):

$$\phi = \frac{CT_{wet} - CT_{dry}}{CT_{water} - CT_{air}} \quad \text{(Equation 1)}$$

where:
$CT_{wet}$=Mean CT number of the slice with core saturated with water
$CT_{dry}$=Mean CT number of the slice when the core is dry
$CT_{water}$=Mean CT number of the water
$CT_{air}$=Mean CT number of air
Core Loading
The core was then loaded in the core-holder and then pressure tested by an external pump by applying an overburden pressure of 1000 psi for up to 24 hours. After making sure that there is no leakage or pressure drop the core holder was fitted into the oven.
Pressure Build-Up and Re-Saturation
1 Pore Volume (PV) formation brine was then flowed through the core to completely re-saturate the core and build the pressure up to the required reservoir pressure i.e. 1800 psi. Overburden pressure was increased simultaneously to 2500 psi to maintain a net 700 psi pressure differential. Backpressure was applied using nitrogen gas to control the pore pressure. Permeability calculations where then performed using Darcy law equation:

$$k = \frac{q\mu L}{A\Delta P} \quad \text{(Equation 2)}$$

Oil Saturation 1.5 PV oil was then injected at 0.25 cc/min to saturate the core and get Initial Water Saturation ($Sw_i$), which was measured by simple material balance keeping track of the injected and produced fluids.

Heating of the System of Aging

The oven was then started to heat the system gradually to 90° C. The core was then left to age at that temperature for 5 days.

Waterflooding

Waterflooding was performed after aging of the core, by injecting the prepared injection brine at 0.5 cc/min till 2 PV of the system. Oil recovery was calculated by measuring the produced oil from the core.

$CO_2$-Surfactant Flooding

Brine flooding was followed by the different injection strategies that were designed and are described in the Table 2.

The $CO_2$ and the surfactant solution were injected at 0.3 cc/min during the individual and alternating experiments and at 0.15 cc/min during the co-injection experiments. The increase in the oil recovery through each method or strategy was noted and then compared at the end to propose the best technique observed. All the flooding schemes were followed up with another brine cycle to thoroughly displace all the movable oil from the core.

The oven was then switched off, pressure was released and the core removed from the system for CT scan. Cleaning of the system was done after each experiment in preparation for the next experiment.

Example 5

Interfacial Tension Measurements

Density Calculations

In order to perform the IFT experiments, firstly the density of the fluids was measured at the desired experimental conditions (90° C. and different pressures). This was done using the high pressure density meter described herein. Firstly, before making any measurements the equipment was calibrated with two fluids of known density at each of the desired conditions. Nitrogen gas and distilled water were used as the reference fluids. Each of these fluids were injected into the cell at the desired temperature (90° C.) and each of the pressure conditions. The temperature was set using the heater and the two thermostats present inside the cell and the pressure was kept constant using an ISCO syringe pump. The density values were input into the software based on which two coefficients were calculated and the density adjusted for that particular condition. Once the equipment was adjusted for each point, the samples for which the IFT had to be calculated were introduced into the cell and the density values were measured according to the density adjustment at that condition.

IFT Procedure

All the lines, viewing chamber, transfer cells and the capillary were cleaned and dried before being fitted into the main steel base of the equipment. Vacuum was then applied to evacuate the cells, chamber and the lines of any air. The desired working temperature was set. The drop and bulk fluids were then loaded. Then, the desired pressure was set using the manual pumps. The experiment to be conducted was defined on the software (i.e. rising drop). The drop and the bulk density values calculated earlier were entered. Camera focus was then performed to obtain a clear view of

TABLE 2

| Injection strategies for the core-flooding experiments. | | | |
| --- | --- | --- | --- |
| Base Case | Experiment 1 | $CO_2$ Flooding | 2.5 PV $CO_2$ |
| Alternate Surfactant Solution-$CO_2$ Flooding | Experiment 2 | Equal Slug Sizes (Total 2.5 PV) | 1. 0.5 PV Surfactant Solution<br>2. 0.5 PV $CO_2$<br>3. 0.5 PV Surfactant Solution<br>4. 0.5 PV $CO_2$<br>5. 0.25 PV Surfactant Solution<br>6. 0.25 PV $CO_2$ |
| | Experiment 3 | Smaller Surfactant Solution, Larger $CO_2$ slugs (Total 2.5 PV) | 1. 0.25 PV Surfactant Solution<br>2. 0.75 PV $CO_2$<br>3. 0.25 PV Surfactant Solution<br>4. 0.75 PV $CO_2$<br>5. 0.125 PV Surfactant Solution<br>6. 0.375 PV $CO_2$ |
| | Experiment 4 | Larger surfactant solution, smaller $CO_2$ slugs (Total 2.5 PV) | 1. 0.75 PV Surfactant Solution<br>2. 0.25 PV $CO_2$<br>3. 0.75 PV Surfactant Solution<br>4. 0.25 PV $CO_2$<br>5. 0.375 PV Surfactant Solution<br>6. 0.125 PV $CO_2$ |
| Simultaneous Surfactant Solution-$CO_2$ Flooding | Experiment 5 and 6 | Co-injection (Total 2.5 PV) | 2.5 PV Surfactant Solution + $CO_2$ | the chamber. Calibration of the needle was done and the detection lines were adjusted. The export parameters were defined to save the results and the images on the computer. The drop of oil was then created. Depending on the drop, the detection level was adjusted and then the measurements were started and the results and images were saved. In addition to the IFT value, the software also measured the drop diameter, drop volume and the bond number.

Only those results were used and reported where the drop of oil was stable for at least 10 minutes. The software developed for this equipment takes into account all the points from the shape of the drop to solve the Laplace equation to calculate the IFT. The software uses at least 80 points on the shape of the drop for the IFT calculation. This enables increased accuracy as earlier software only used two or three main parameters to compute the IFT.

Example 6

Core Dimension Measurements

The dimensions of each core were measured before starting the experiment. The core diameter, length and weight were measured to calculate the bulk volume of the cylindrical core. The core weight was again measured after brine saturation. The difference in weight between the wet and the dry core was divided by the formation brine density to get the pore volume of each core. Porosity was then calculated using the pore and bulk volumes for each core. All these values are tabulated in Table 3.

TABLE 3

Properties of the cores used in Experiments 1-6.

| Experiment | Experiment 1 | Experiment 2 | Experiment 3 | Experiment 4 | Experiment 5 | Experiment 6 |
|---|---|---|---|---|---|---|
| Core Dia (cm) | 3.81 | 3.78 | 3.77 | 3.77 | 3.77 | 3.81 |
| Core Length (cm) | 30.48 | 30.48 | 30.45 | 30.44 | 30.48 | 30.48 |
| Core Bulk Volume (cm³) | 347.5 | 343 | 340 | 340 | 340.2 | 347.5 |
| Core Dry Weight (g) | 728 | 745 | 748 | 737 | 755.15 | 748 |
| Core Wet Weight (g) | 797 | 809 | 811.5 | 807.3 | 818.15 | 813 |
| Core Pore Volume (cm³) | 60.82 | 55 | 55.15 | 61.7 | 55.12 | 56.5 |
| Core Porosity (%) | 17.5 | 16 | 16.2 | 18.16 | 16.2 | 16.26 |

Example 7

CT Scan Measurements

CT scan of the cores was performed for two of the experiments both before and after saturation with formation brine. The scan was also done for the brine sample to get the CT number of the brine. Porosity was calculated using the CT numbers obtained and the measurements were close to the porosity values obtained by weight method. The scan for experiment 6 was performed with a newer machine, which resulted in a much closer match of the porosity values. These values are tabulated in Table 4.

TABLE 4

CT scan results for Experiments 1 and 6.

| Experiment | CT Number (dry core) | CT Number (saturated core) | CT Number (brine) | CT Number (air) | Porosity through CT scan (%) | Porosity through weight method (%) |
|---|---|---|---|---|---|---|
| Experiment 1 | 2422.03 | 2227.67 | 356.29 | −1000 (default) | 14.3 | 16 |
| Experiment 6 | 2534.06 | 2312.45 | 356.29 | −1000 (default) | 16.34 | 16.26 |

Example 8

Oil Saturation

After each core was loaded in the system and re-saturated with formation brine at the desired pressure, the first flooding was performed with oil to displace the formation water, saturate the core with oil and establish $Sw_i$.

Oil was injected by means of an outside transfer cell that was connected to an ISCO pump which was used to inject the oil at the set flow rate of 0.25 cc/min. The produced fluids from the core were collected in graduated cylinders placed outside the oven through the core outlet line. Water recovery from the core was calculated after subtracting the dead volume from the produced volume. The dead volume consisted of the outlet and the inlet tubing lines where the oil displaced the formation brine.

Initially when oil was injected there was almost a linear relationship between the injected oil and the produced water. However, once the oil breakthrough occurred, the water production declined drastically and eventually only oil was produced from the core. The oil injection was stopped at that point, however in each case, more than 1 PV of oil was injected. The oil breakthrough occurred between 0.6 PV to 0.8 PV injected. The initial water saturations for each of the core-flooding experiments are tabulated in Table 5 and the water recovery trends are shown in FIGS. 3A-3F.

TABLE 5

Initial water saturations for core-flooding Experiments 1-6.

| Experiment | Experiment 1 | Experiment 2 | Experiment 3 | Experiment 4 | Experiment 5 | Experiment 6 |
|---|---|---|---|---|---|---|
| Initial Water Saturation ($Sw_1$) | 41% | 30% | 21% | 25% | 24% | 34% |

Example 9

Core-Flooding Experiments 1-6

After the aging period of 5 days, core-flooding was performed. The injection cycles were followed as described earlier. Based on the type of injection strategy, the corefloods can be classified into 3 different strategies: The base experiment of only $CO_2$ injection (Experiment 1), experiments of alternate surfactant and $CO_2$ cycles (Experiments 2, 3 and 4) and co-injection experiments of surfactant and $CO_2$ (Experiments 5 and 6). In all the experiments, initially waterflooding was performed and another brine slug was injected at the end of the experiment. The total oil recovered from the core was calculated by subtracting the dead volume from the produced oil. The results of each of the core-flooding experiments are detailed below:

Experiment 1—Base Case $CO_2$ Flooding

In Experiment 1, the flooding was performed in the following manner:
1. 2 PV of brine (sea water).
2. 2.5 PV of $CO_2$.
3. 1 PV of brine (sea water).

Figure 4A:
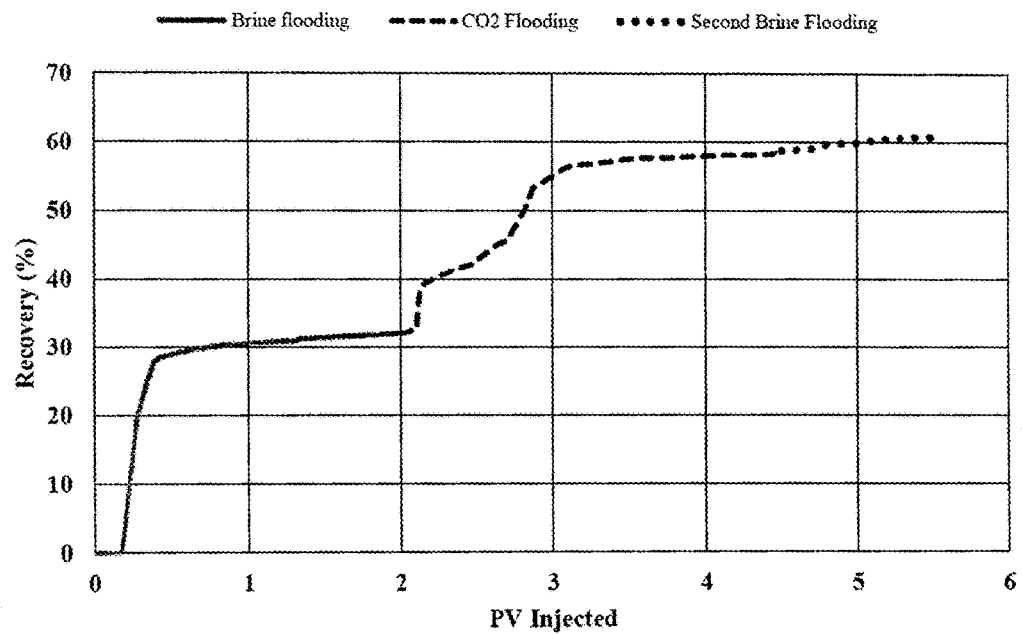
FIG. 4A is a curve showing the oil recovery trend of Experiment 1.
Figure 4B:
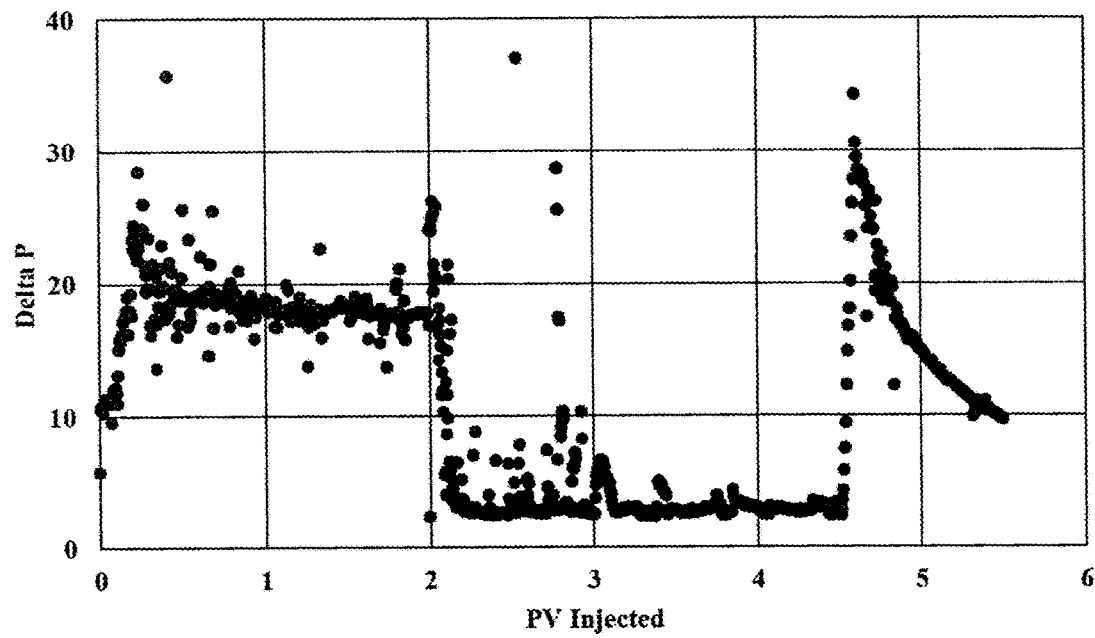
FIG. 4B is a curve showing the pressure drop trend of Experiment 1.

The amount of oil recovered in each cycle is tabulated in Table 6. The oil recovery trend and delta P trend during the entire flooding are plotted in FIGS. 4A and 4B.

TABLE 6

Oil recovery of Experiment 1.

| Cycle | Pore Volume | Oil Recovery (%) |
|---|---|---|
| 1st Brine Flooding | 2 PV | 32 |
| $CO_2$ Flooding | 2.5 PV | 26.2 |
| 2nd Brine Flooding | 1 PV | 2.5 |
| Total | 5.5 PV | 60.7 |

Experiments 2, 3 and 4—Alternate Surfactant Solution and $CO_2$ Flooding

These experiments alternating surfactant solution and $CO_2$ flooding were conducted to study the effect of cycle size on the increment in oil recovery. Three experiments were performed using this strategy. The slug sizes were different in each experiment. The results of these experiments are detailed below.

Experiment 2—Equal Slug Sizes

In Experiment 2, the flooding was performed in the following manner:
1. 2 PV of brine (sea water).
2. 0.5 PV of surfactant solution.
3. 0.5 PV of $CO_2$.
4. 0.5 PV of surfactant solution.
5. 0.5 PV of $CO_2$.
6. 0.25 PV of surfactant solution.
7. 0.25 PV of $CO_2$.
8. 1 PV of brine (sea water).

Figure 5A:
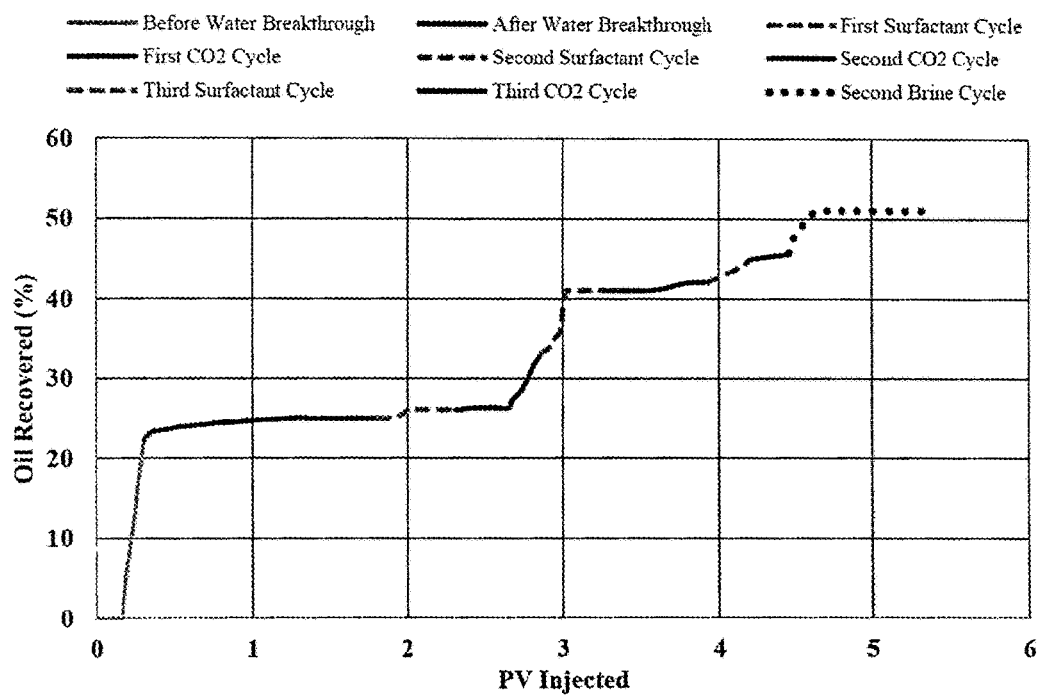
FIG. 5A is a curve showing the oil recovery trend of Experiment 2.
Figure 5B:
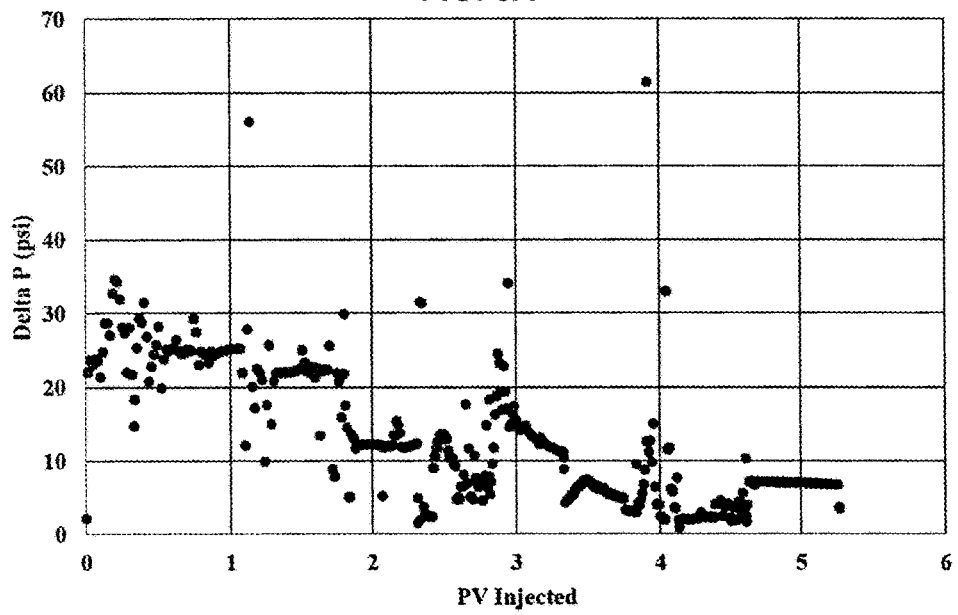
FIG. 5B is a curve showing the pressure drop trend of Experiment 2.

The amount of oil recovered in each cycle is tabulated in Table 7. The oil recovery trend and the delta P trend during the entire flooding are plotted in FIGS. 5A and 5B.

TABLE 7

Oil recovery of Experiment 2.

| Cycle | Pore Volume | Oil Recovery (%) |
|---|---|---|
| 1st Brine Flooding | 2 PV | 25.2 |
| Surfactant Solution Flooding | 0.5 PV | 1 |
| $CO_2$ Flooding | 0.5 PV | 7.2 |
| Surfactant Solution Flooding | 0.5 PV | 8 |
| $CO_2$ Flooding | 0.5 PV | 1 |
| Surfactant Solution Flooding | 0.25 PV | 2.66 |
| $CO_2$ Flooding | 0.25 PV | 1 |
| 2nd Brine Flooding | 1 PV | 5.3 |
| Total | 5.5 PV | 51.6 |

Experiment 3—Larger $CO_2$ Slug Sizes

In Experiment 3, the flooding was performed in the following manner:
1. 2 PV of brine (sea water).
2. 0.25 PV of surfactant solution.
3. 0.75 PV of $CO_2$.
4. 0.25 PV of surfactant solution.
5. 0.75 PV of $CO_2$.
6. 0.125 PV of surfactant solution.
7. 0.375 PV of $CO_2$.
8. 1 PV of brine (sea water).

Figure 6A:
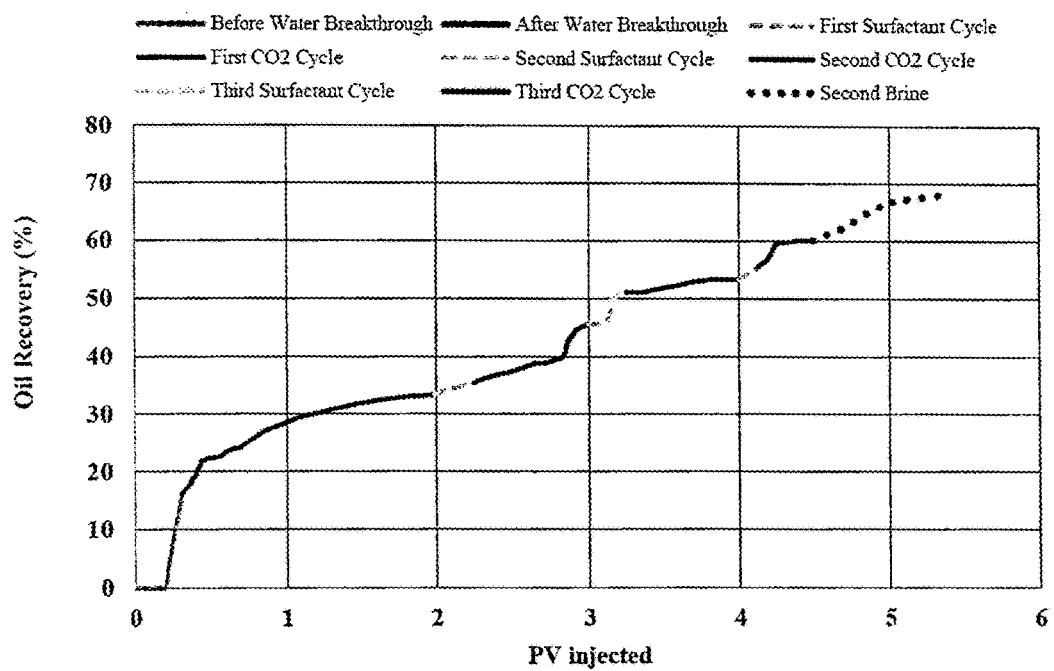
FIG. 6A is a curve showing the oil recovery trend of Experiment 3.
Figure 6B:
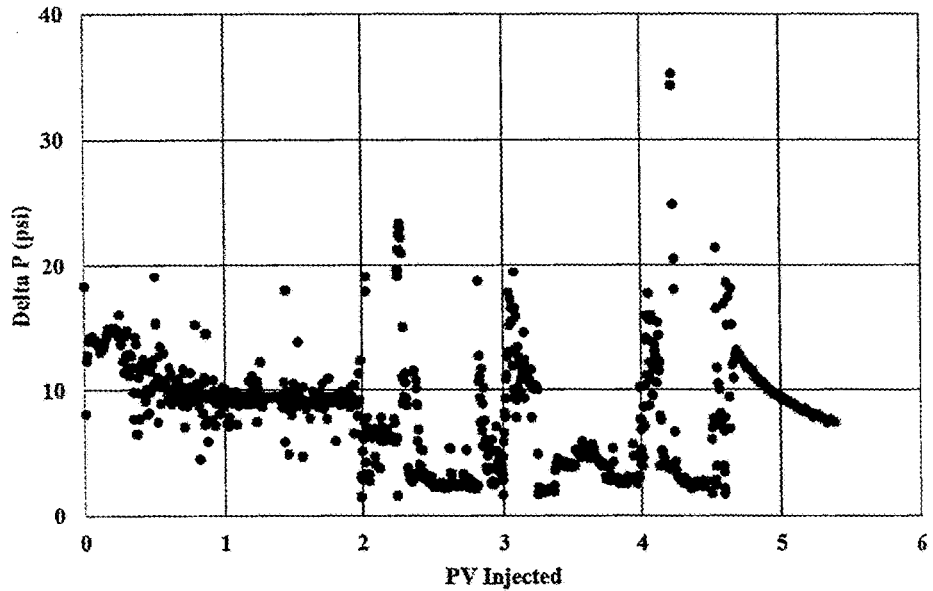
FIG. 6B is a curve showing the pressure drop trend of Experiment 3.

The amount of oil recovered in each cycle is tabulated in Table 8. The oil recovery trend and the delta P trend during the entire flooding are plotted in FIGS. 6A and 6B.

TABLE 8

Oil recovery of Experiment 3.

| Cycle | Pore Volume | Oil Recovery (%) |
|---|---|---|
| 1st Brine Flooding | 2 PV | 33.2 |
| Surfactant Solution Flooding | 0.25 PV | 2 |
| $CO_2$ Flooding | 0.75 PV | 10.25 |
| Surfactant Solution Flooding | 0.25 PV | 5.5 |
| $CO_2$ Flooding | 0.75 PV | 2.3 |
| Surfactant Solution Flooding | 0.125 PV | 2.3 |
| $CO_2$ Flooding | 0.375 PV | 4.5 |
| 2nd Brine Flooding | 1 PV | 6.8 |
| Total | 5.5 PV | 67 |

Experiment 4—Larger Surfactant Solution Slug Sizes

In Experiment 4, the flooding was performed in the following manner:
1. 2 PV of brine (sea water).
2. 0.75 PV of surfactant solution.
3. 0.25 PV of $CO_2$.
4. 0.75 PV of surfactant solution.
5. 0.25 PV of $CO_2$.
6. 0.375 PV of surfactant solution.

7. 0.125 PV of $CO_2$.
8. 1 PV of brine (sea water).

Figure 7A:
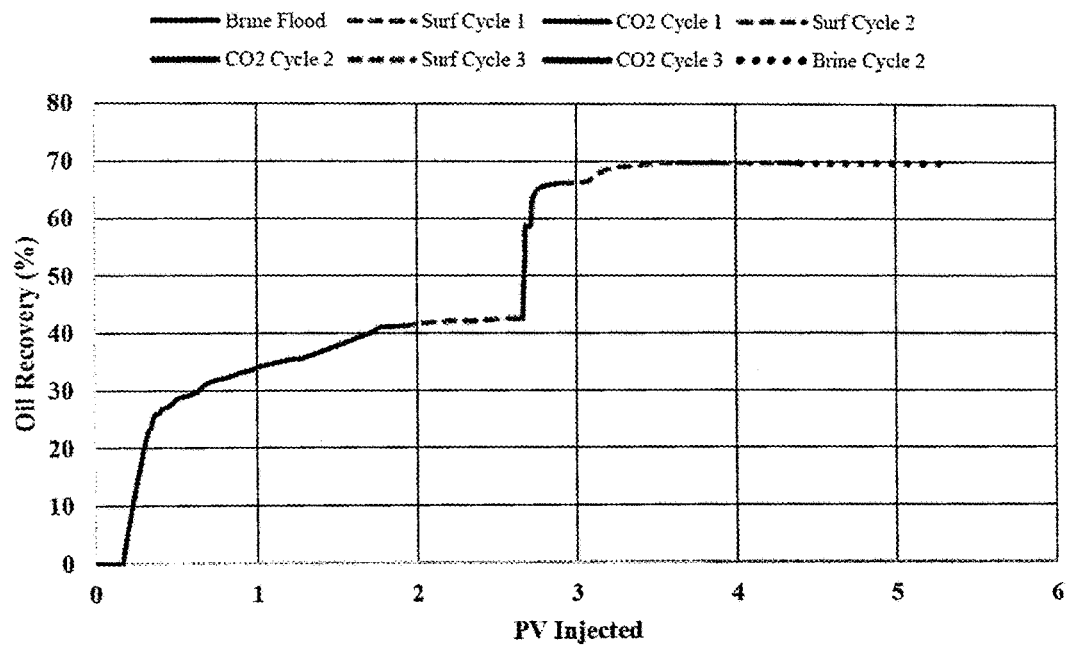
FIG. 7A is a curve showing the oil recovery trend of Experiment 4.
Figure 7B:
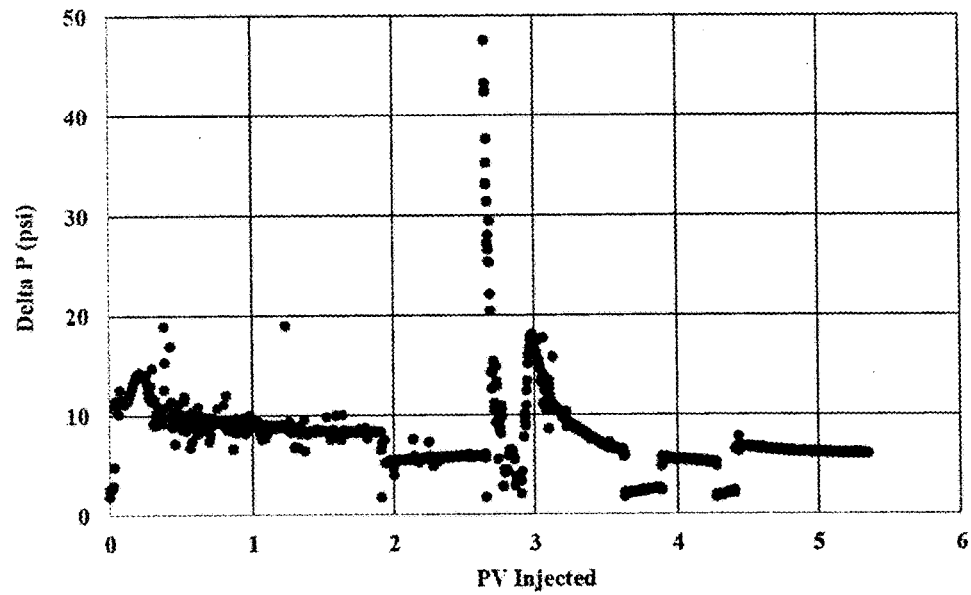
FIG. 7B is a curve showing the pressure drop trend of Experiment 4.

The amount of oil recovered in each cycle is tabulated in Table 9. The oil recovery trend and the delta P trend during the entire flooding are plotted in FIGS. 7A and 7B.

TABLE 9

Oil recovery of Experiment 4.

| Cycle | Pore Volume | Oil Recovery (%) |
|---|---|---|
| 1$^{st}$ Brine Flooding | 2 PV | 41.18 |
| Surfactant Solution Flooding | 0.75 PV | 1.3 |
| $CO_2$ Flooding | 0.25 PV | 23.75 |
| Surfactant Solution Flooding | 0.75 PV | 3.5 |
| $CO_2$ Flooding | 0.25 PV | 0 |
| Surfactant Solution Flooding | 0.375 PV | 0 |
| $CO_2$ Flooding | 0.125 PV | 0 |
| 2$^{nd}$ Brine Flooding | 1 PV | 0 |
| Total | 5.5 PV | 69.7 |

Experiments 5 and 6—Combined Surfactant Solution and $CO_2$ Flooding (Co-Injection)

Co-injection experiments were conducted to study the effect of co-injection of the two fluids and possible formation of foam on the increment in oil recovery. Two experiments were performed using this strategy. The surfactants were different in each experiment. The results of these experiments is given below.

Experiment 5—Co-Injection Using Fluorosurfactant
In Experiment 5, the flooding was performed in the following manner:
1. 2 PV of brine (sea water).
2. 2.5 PV of Surfactant Solution and $CO_2$.
3. 1 PV of brine (sea water).

The amount of oil recovered in each cycle is tabulated in Table 10. The oil recovery and the delta P trend during the entire flooding are plotted in FIGS. 8A and 8B.

TABLE 10

Oil recovery of Experiment 5.

| Cycle | Pore Volume | Oil Recovery (%) |
|---|---|---|
| 1$^{st}$ Brine Flooding | 2 PV | 39.5 |
| Surfactant-$CO_2$ Flooding | 2.5 PV | 24.3 |
| 2$^{nd}$ Brine Flooding | 1 PV | 2.6 |
| Total | 5.5 PV | 66.4 |

Experiment 6—Co-Injection Using Ethomeen
In Experiment 6, the flooding was performed in the following manner:
1. 2 PV of brine (sea water).
2. 2.5 PV of Surfactant Solution and $CO_2$.
3. 0.15 PV of brine (sea water).

Figure 9A:
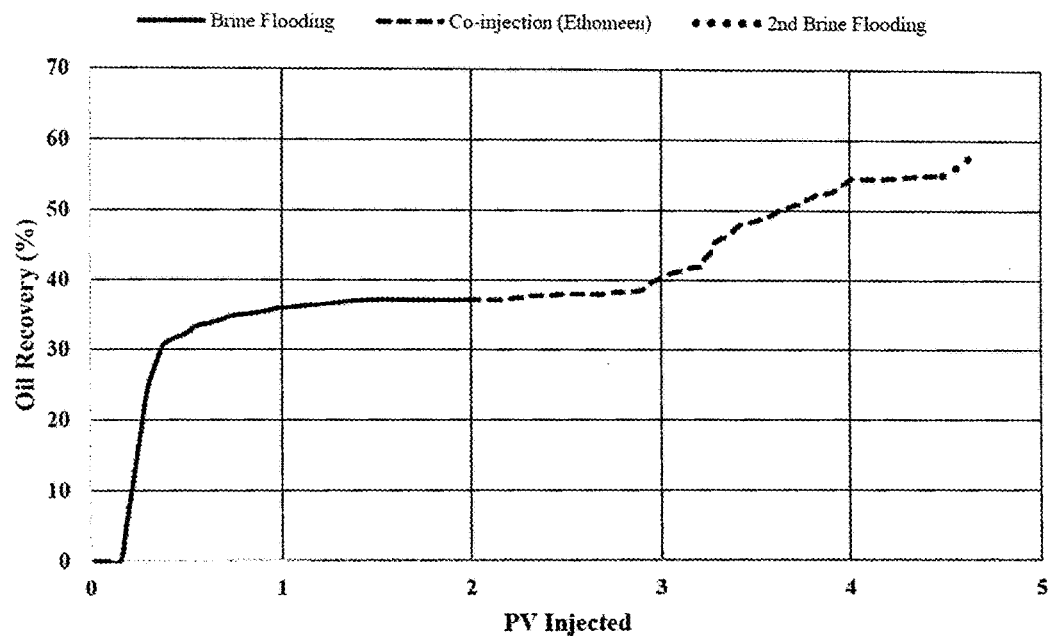
FIG. 9A is a curve showing the oil recovery trend of Experiment 6.
Figure 9B:
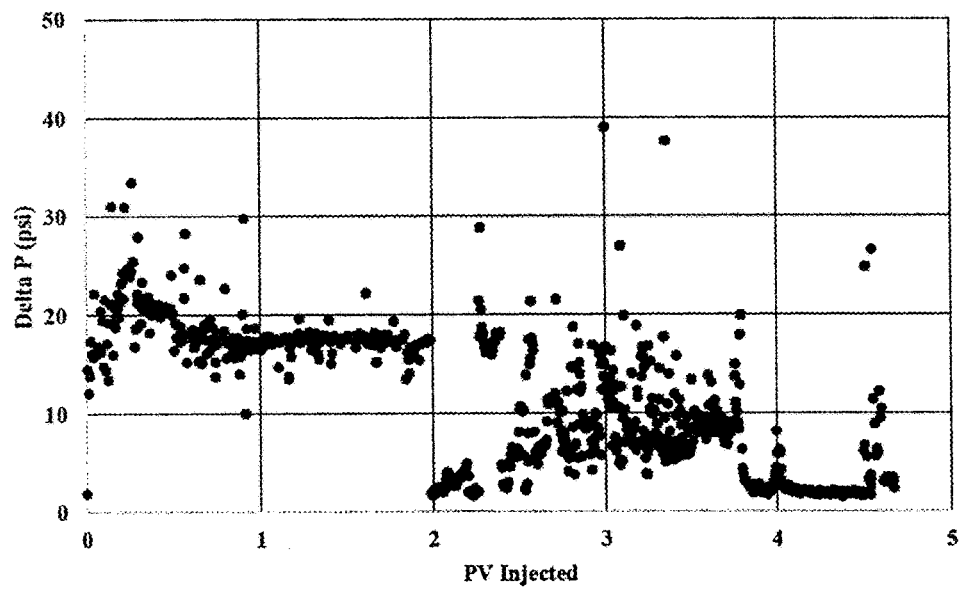
FIG. 9B is a curve showing the pressure drop trend of Experiment 6.

The second brine cycle could not be completed due to a problem in the back pressure regulator. Since this experiment was conducted to compare the performance with the fluoro-surfactant, thus the comparison for the two experiments was done on the basis of the surfactant-$CO_2$ co-injection cycle. The amount of oil recovered in each cycle is tabulated in Table 11. The oil recovery trend and the delta P trend during the entire flooding are plotted in FIGS. 9A and 9B.

TABLE 11

Oil recovery of Experiment 6.

| Cycle | Pore Volume | Oil Recovery (%) |
|---|---|---|
| 1$^{st}$ Brine Flooding | 2 PV | 37 |
| Surfactant-$CO_2$ Flooding | 2.5 PV | 18 |
| 2$^{nd}$ Brine Flooding | 1 PV | 3 |
| Total | 5.5 PV | 58 |

The results of all the core-flooding experiments are summarized in Table 12. The RF (recovery factor) efficiency is the amount of oil recovered from the oil left in the core after the first brine flood.

TABLE 12

Summary of core-flooding experiment results.

| Experiment | Experiment 1 | Experiment 2 | Experiment 3 | Experiment 4 | Experiment 5 | Experiment 6 |
|---|---|---|---|---|---|---|
| Total Oil Recovery | 60.72% | 51.6% | 67% | 69.7% | 66.4% | 58% |
| RF efficiency after brine flood | 43.8% | 34.7% | 52% | 48% | 44.4% | 32.7% |

The base case of only using $CO_2$ after the first brine flood (Experiment 1), gave a significant rise in the oil recovery. This indicates that $CO_2$ itself is quite effective in increasing oil recovery. However, the effectiveness of $CO_2$ could increase if its mobility is reduced enabling higher contact with the oil. To do so, in all the next experiments, a surfactant was used with the $CO_2$ in different combinations, to see if it provides any additional increment in oil recovery.

Example 10

Effect of Slug Size on Oil Recovery

As described herein, three experiments using the alternate surfactant solution and $CO_2$ injection strategy were performed, namely Experiment 2, Experiment 3 and Experiment 4. The total PV injected was same (2.5 PV), but the individual slug sizes were changed. In all the three experiments, the maximum increment in the oil recovery was observed during the first and second cycles. The first injected $CO_2$ slug and the surfactant solution slug immediately after, produced the largest quantity of oil. The increment in oil recovery after the first brine flooding and the contribution of the first $CO_2$ and the surfactant solution slug immediately after, for each of the three experiments is tabulated in Table 13.

TABLE 13

Comparison of alternate core-flooding
experiments (Experiments 2, 3 and 4).

| | Experiment | | |
|---|---|---|---|
| | Experiment 2 | Experiment 3 | Experiment 4 |
| Increment in oil recovery after first brine flood (%) | 26.4 | 33.8 | 27.9 |
| Contribution of $1^{st}$ $CO_2$ and $2^{nd}$ surfactant solution slugs (%) | 57.5 | 46.6 | 97.6 |

Figure 10:
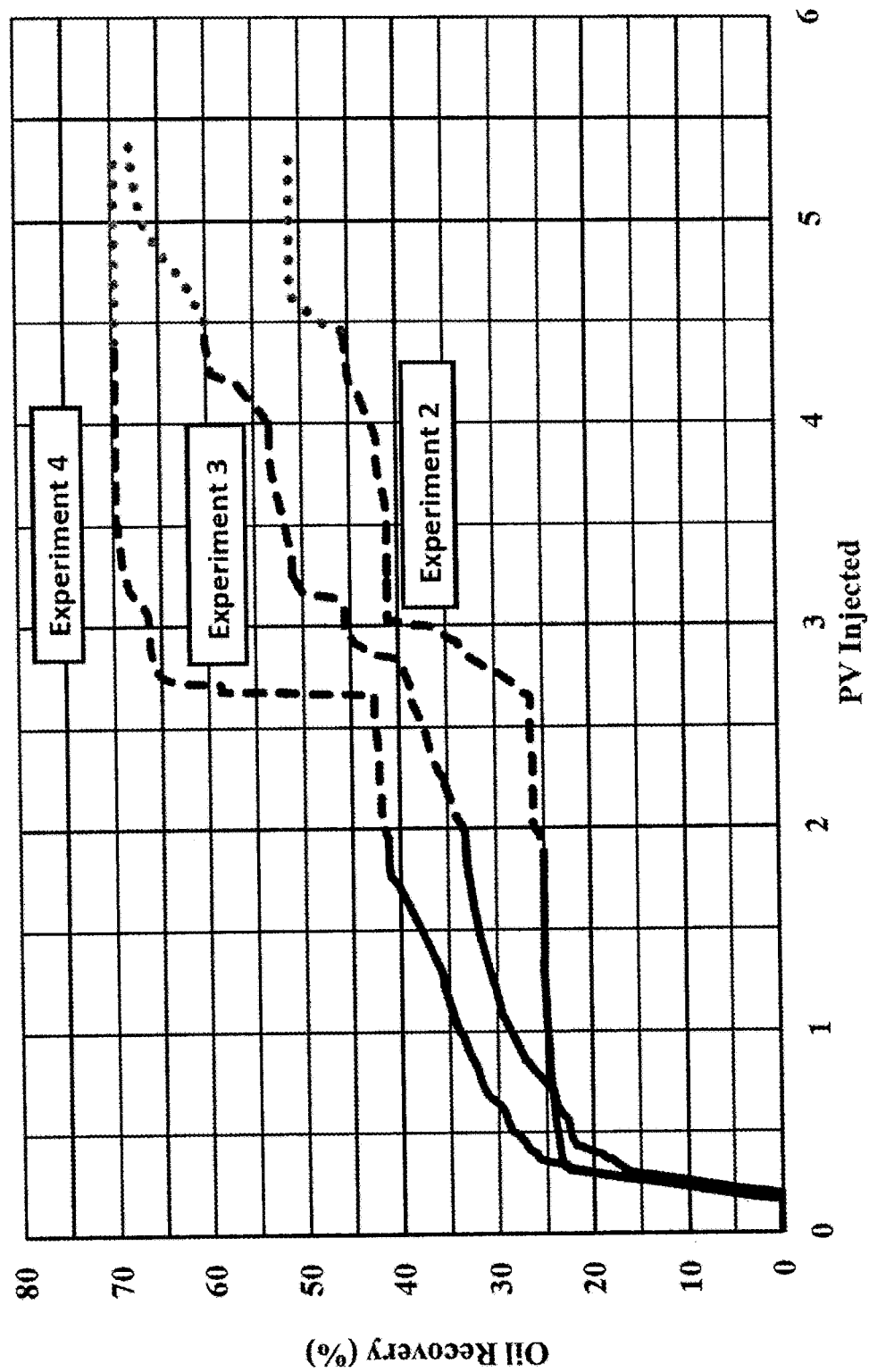
FIG. 10 shows the comparison of oil recovery for the alternating strategies of Experiments 2, 3 and 4.

The biggest increment in the recovery factor after brine flooding (~34%) was observed in Experiment 3 where the $CO_2$ slug size was bigger than the surfactant slug size. The highest total recovery was obtained for Experiment 4 where a bigger surfactant solution slug size was injected prior to the $CO_2$ slug. This experiment also exhibited a different trend in which all the oil was recovered in the first three half-cycles with no oil recovery in the next cycles. This showed that the recovery can be obtained much quickly if this strategy is followed. On the contrary, in Experiment 3 where the $CO_2$ slug size is bigger, oil continues to come till the last cycle. This experiment gave the highest increment in oil recovery after brine flooding (~34%) and supports the argument that $CO_2$ plays a bigger role in mobilizing and producing the oil than the surfactant solution. Experiment 2, was performed keeping the slug sizes equal. This experiment gave the lowest total oil recovery among all the experiments. However this low recovery was due to the low recovery obtained during the first brine cycle. The increment in the oil recovery during the surfactant solution-$CO_2$ cycles was similar to the other experiments. This experiment showed that even if the oil recovery is low after secondary recovery process, the surfactant-$CO_2$ system is effective in increasing the oil recovery. The second brine flood which was conducted at the end of the experiments also contributed to the increase in oil recovery in Experiments 2 and 3. This increase was as a result of the brine displacing the oil in the tubing lines from the core outlet to the fluid collection point which had been recovered during the $CO_2$ slug prior to the brine flood. Table 14 and FIG. 10 show the comparison of the three alternating strategy experiments.

Example 11

Effect of Co-Injection

Figure 11:
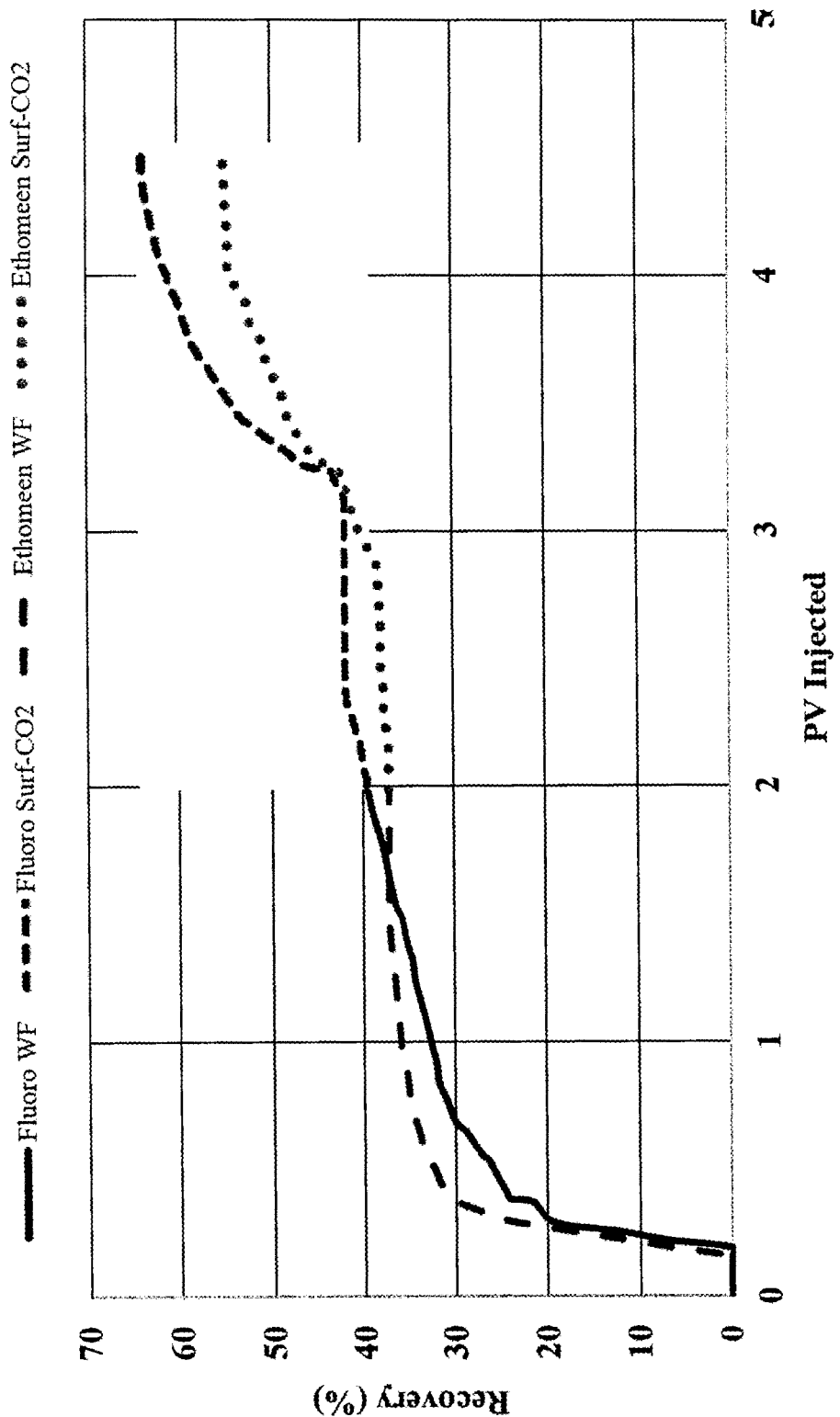
FIG. 11 shows the comparison of oil recovery of the co-injection Experiments 5 and 6.

The next injection strategy that was pursued in the present disclosure was the simultaneous injection of surfactant solution and $CO_2$. Both the fluids were injected at the same flow rate together into the core. Using this scheme, two experiments were conducted. In Experiment 5, the same fluoro-surfactant was used that was used in the alternating cycle experiments, while in Experiment 6, a different surfactant was used. This enabled the comparison of the injection schemes, as well as the two surfactants. The oil recovery trend for both the Experiments 5 and 6 was similar using this strategy. At the start of the flooding cycle, there was very little oil recovery. The recovery started to increase after around 1 PV of fluid had been injected and oil continued to produce till around 2 PV on the fluids was injected. The fluoro-surfactant $CO_2$ combination had a higher recovery than the ethomeen-$CO_2$ combination. Table 15 and FIG. 11 show the comparison between the Experiment 5 and Experiment 6. Experiment 5 is further detailed in Table 16.

TABLE 15

Comparison of co-injection Experiments 5 and 6.

| Experiment | Experiment 5 | Experiment 6 |
|---|---|---|
| Total Oil Recovery (%) | 66.4 | 58 |
| Oil Recovery during surf-$CO_2$ flooding | 24.3 | 18 |

TABLE 16

Details of continuous fluorosurfactant-$CO_2$ flooding Experiment 5.

| | | | Experiment 5 |
|---|---|---|---|
| Ø (%) | Pore Volume (cc) | 16 | 55.12 |
| $Sw_i$ (%) | | | 24.35 |
| | Recovery Factor (%) | | |
| Brine Flooding | | | 39.5 |
| Surfactant $CO_2$ | 2.5 PV | | 24.3 |
| $2^{nd}$ Brine Flooding | | | 2.6 |
| Total | | | 66.4 |

TABLE 14

Details of alternate surfactant-$CO_2$ flooding experiments.

| | | | Experiment 2 | | Experiment 3 | | Experiment 4 | |
|---|---|---|---|---|---|---|---|---|
| | Ø (%) | Pore Volume (cc) | 16 | 55 | 16.2 | 55.15 | 18.16 | 61.7 |
| | $Sw_1$ (%) | | 31.6 | | 20.4 | | 25.6 | |
| | | Recovery Factor (%) | | | | | | |
| | Brine Flooding | | 25.2 | | 33.2 | | 41.18 | |
| $1^{st}$ Cycle | Surf Sol | | 0.5 PV | 1 | 0.25 PV | 2 | 0.75 PV | 1.3 |
| | $CO_2$ | | 0.5 PV | 7.2 | 0.75 PV | 10.25 | 0.25 PV | 23.75 |
| $2^{nd}$ Cycle | Surf Sol | | 0.5 PV | 8 | 0.25 PV | 5.5 | 0.75 PV | 3.5 |
| | $CO_2$ | | 0.5 PV | 1 | 0.75 PV | 2.3 | 0.25 PV | 0 |
| $3^{rd}$ Cycle | Surf Sol | | 0.25 PV | 2.66 | 0.125 PV | 2.3 | 0.375 PV | 0 |
| | $CO_2$ | | 0.25 PV | 1 | 0.375 PV | 4.5 | 0.125 PV | 0 |
| | $2^{nd}$ Brine Flooding | | 5.3 | | 6.8 | | 0 | |
| | Total | | 51.6 | | 67 | | 69.7 | |

The co-injection experiments did not gave a significant difference in total oil recovery compared to the alternating experiments. However the breakthrough of $CO_2$ was delayed in this strategy, which could be a positive factor if this strategy is applied on the field scale.

Figure 12:
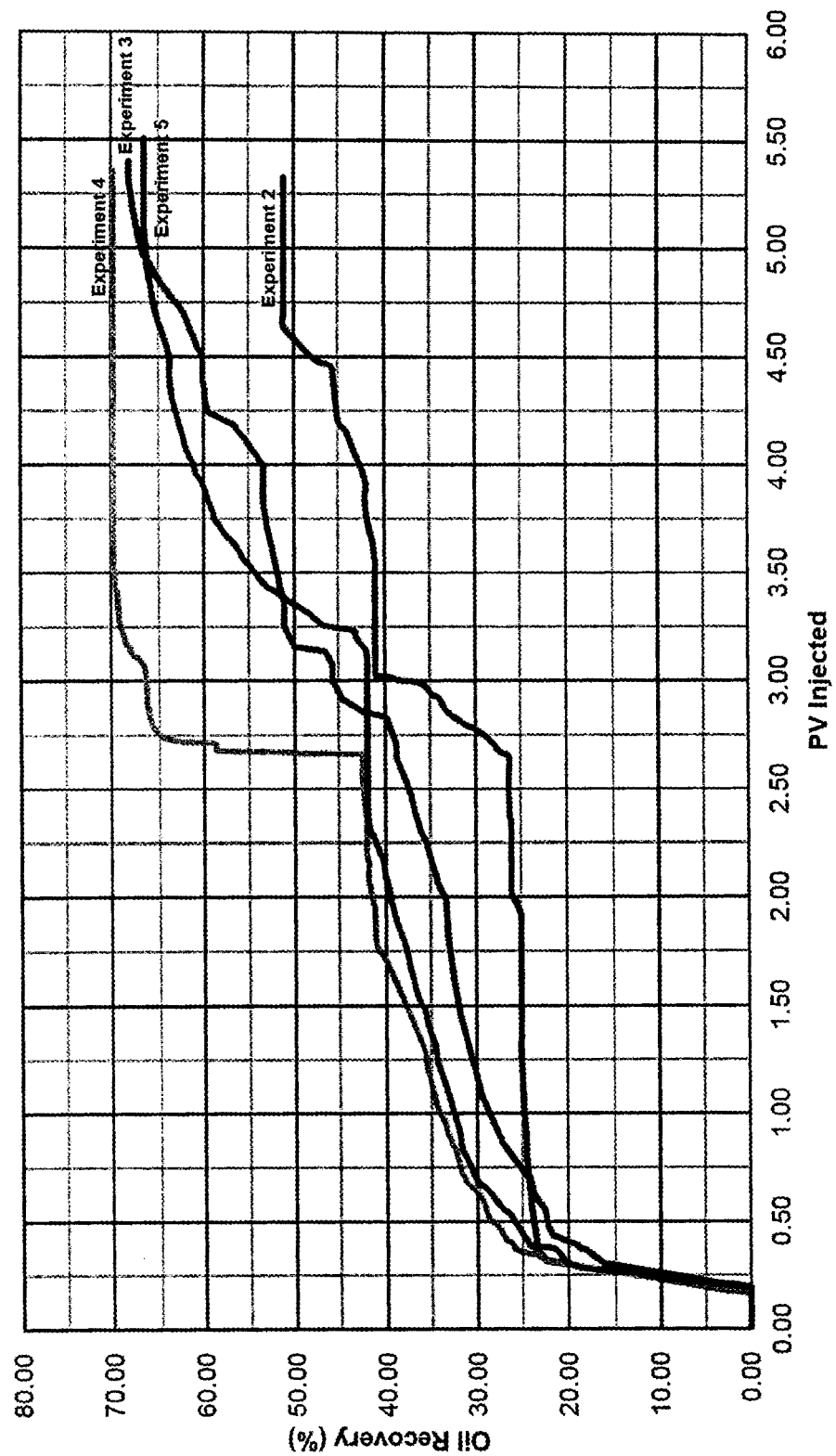
FIG. 12 shows the comparison of oil recovery of Experiments 2, 3, 4 (alternating strategy) and Experiment 5 (co-injection with fluorosurfactant).

Table 17 and FIG. 12 compare the three alternating strategy experiments (Experiments 2, 3 and 4) and the co-injection strategy experiment with the fluorosurfactant solution (Experiment 5). In particular, Table 17 shows the increase in the recovery factor after secondary recoveries while FIG. 12 compares the oil recovery of these experiments.

TABLE 17

Increase in recovery factor after secondary recovery.

| Experiment 2 | Experiment 3 | Experiment 4 | Experiment 5 |
|---|---|---|---|
| 26.4% | 33.8% | 27.9% | 26.9% |

Example 12

Pressure Drop Response and Foam Generation Concept

Figure 8A:
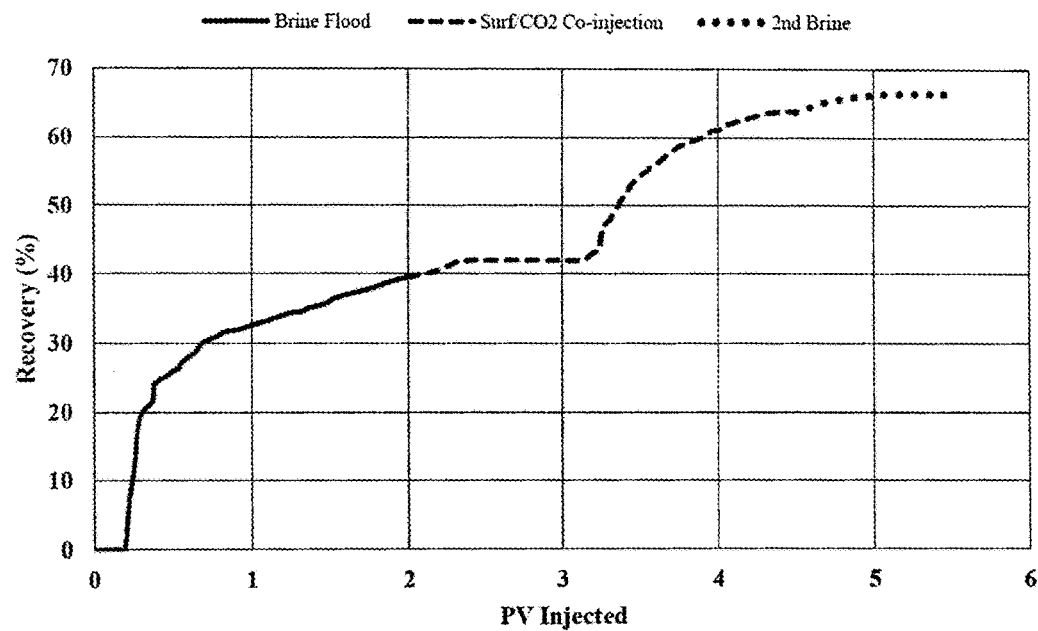
FIG. 8A is a curve showing the oil recovery trend of Experiment 5.
Figure 8B:
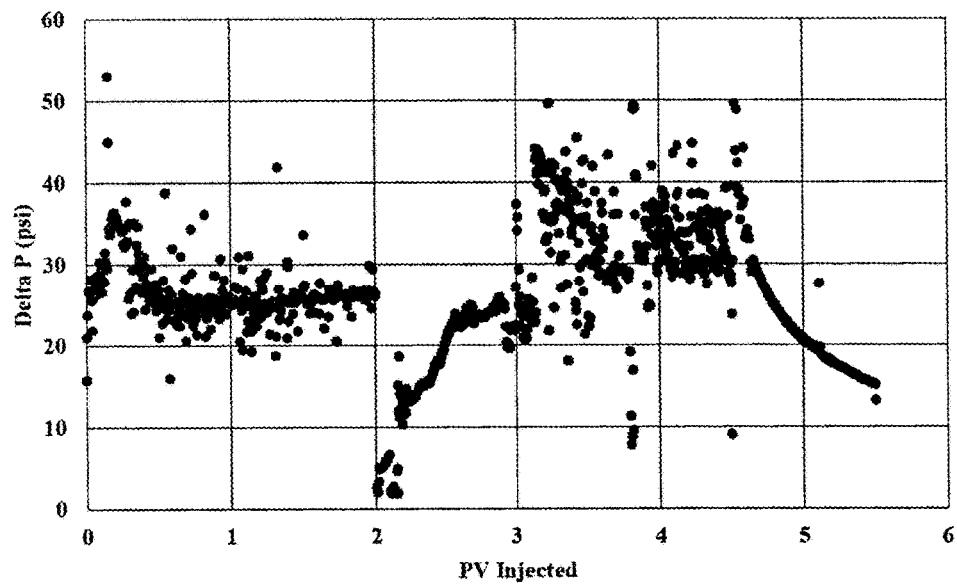
FIG. 8B is a curve showing the pressure drop trend of Experiment 5.
Figure 13:
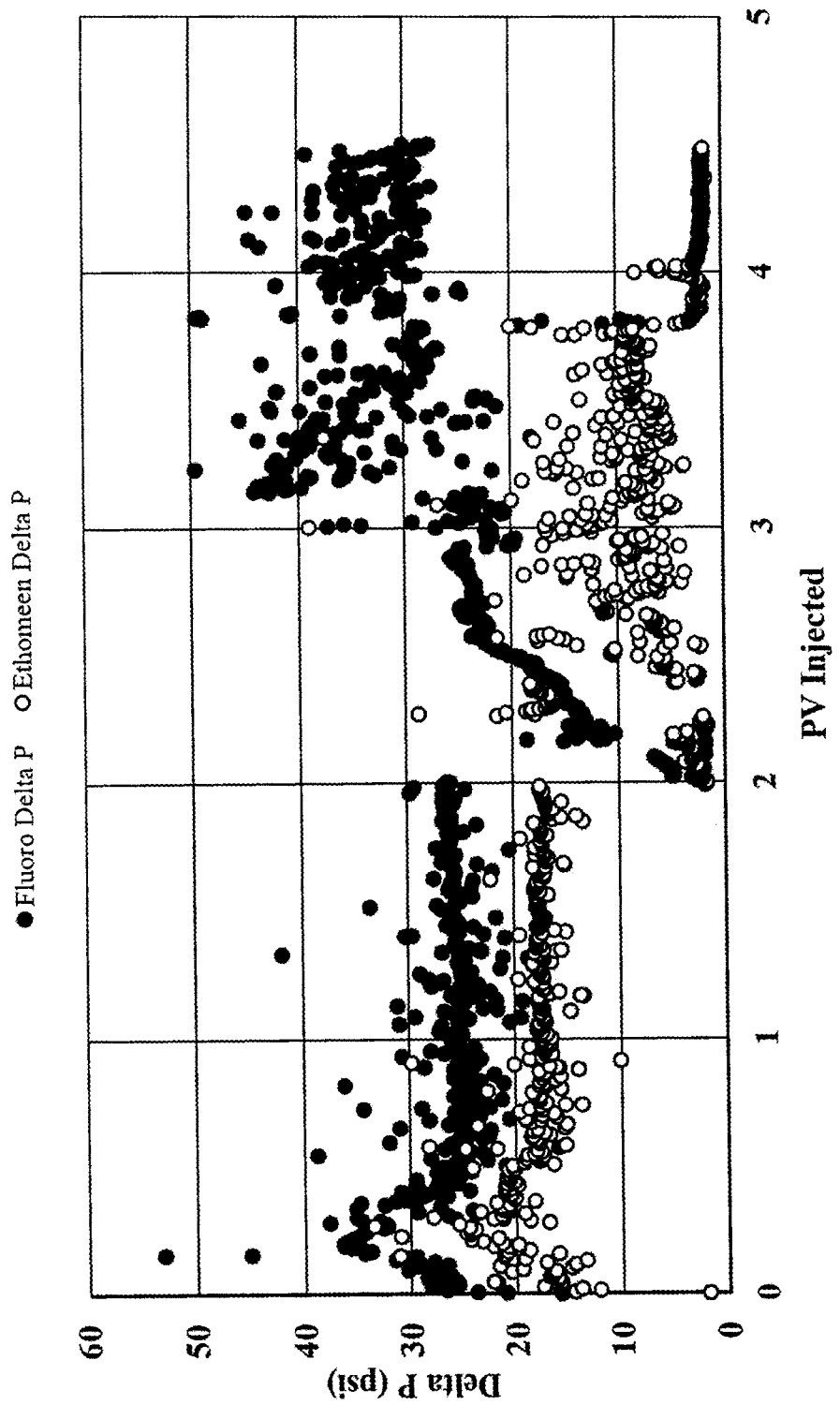
FIG. 13 shows the comparison of pressure drop of the co-injection Experiments 5 and 6.

As with the case with studies conducted prior to the present disclosure (Viet Q. Le, Quoc P. Nguyen and Aaron W. Sanders, 2008, "A Novel Foam Concept with $CO_2$ Dissolved Surfactants", SPE 113370; Mohd Faizal Sedaralit, Nasir B. Darman, Raj Deo Tewari, Ridhwan Zhafri Kamarul Bahrim, Pauziyah Abdul Hamid, Siti Rohaida Mohd Shafian, Arif Azhan Abdul Manap, 2013, "Enhancing the Efficiency of Immiscible Water Alternating Gas (WAG) Injection in a Matured, High Temperature and High $CO_2$ Solution Gas Reservoir—A Laboratory Study", SPE-165303-MS—each incorporated herein by reference in its entirety), in all the alternate flooding experiments (Experiments, 2, 3 and 4), there was no indication of foam generation by the pressure drop response shown in FIGS. 5B, 6B and 7B. This can be due to the high saline environment, high temperature, presence of oil or the low concentration of surfactant in the solution (Alkan, H., Goktekin, A. and Satman, A., 1991, "A Laboratory Study of $CO_2$-foam Process for Bati Rama Field, Turkey", SPE 21409 presented at Middle East Oil Show, Bahrain, 16-19 November; Wang, G. C. 1984, "A Laboratory Study of CO2 Foam Properties and Displacement Mechanism", SPE 12645 presented at SPE Enhanced Oil Recovery Symposium, Tulsa, Okla., 15-18 April; Nikolov, A. D., Wasan, D. T., Huang, D. W. et al, 1986, "The Effect of Oil on Foam Stability: Mechanism and Implications for Oil Displacement by Foam in Porous Media", SPE 15443 presented at SPE Annual Technical Conference and Exhibition, New Orleans, Louisiana, 5-8 October; Friedman, F. and Jensen, J. A., 1986, "Some Parameters Influencing the Formation and Propagation of foams in Porous Media", SPE 15087 presented at SPE California Regional Meeting, Oakland, Calif., 2-4 April; B. Bai, R. B. Grigg, Y. Liu and Z. Zeng, 2005, "Adsorption Kinetics of Surfactant Used in CO2-Foam Flooding Onto Berea Sandstone", SPE 95920—each incorporated herein by reference in its entirety). All these factors hinder the generation and propagation of foam through surfactants and $CO_2$ in porous media. An increase in pressure drop was nevertheless evident when there was high oil recovery. Some researchers have associated this short time of higher delta P to be a sign of foam generation. However recent researches suggest that stable foam should give a continuous high delta P, which was observed in the continuous fluorosurfactant-$CO_2$ flooding experiment (Experiment 5). After injection of around 1.2 PV of continuous surfactant-$CO_2$ slug, the pressure drop increased and remained high during the rest of the flooding cycle. This high delta P matched the increment in oil recovery perfectly as shown in FIGS. 8A and 8B. This experiment showed that foam can be generated by the surfactant solution and $CO_2$ even in typical reservoir conditions, provided a sufficient volume of the slug is injected. This behavior is in concurrence with recent studies (Michel Robin, Joelle Behot, Varvara Sygouni, 2012, "$CO_2$ Injection in Porous Media: Observations in Glass Micromodels under Reservoir Conditions", SPE-154165-MS; Mohd Faizal Sedaralit, Nasir B. Darman, Raj Deo Tewari, Ridhwan Zhafri Kamarul Bahrim, Pauziyah Abdul Hamid, Siti Rohaida Mohd Shafian, Arif Azhan Abdul Manap, 2013, "Enhancing the Efficiency of Immiscible Water Alternating Gas (WAG) Injection in a Matured, High Temperature and High $CO_2$ Solution Gas Reservoir—A Laboratory Study", SPE-165303-MS—each incorporated herein by reference in its entirety). The total recovery factor for this experiment was similar to the alternate flooding experiments, which shows that foam is not always necessary for the increment in oil recovery. Rather it is the combination of the supercritical $CO_2$ and the fluorosurfactant system that makes the oil movable and producible. The pressure drop during the co-injection experiment using ethomeen surfactant was not as high as the pressure drop during the fluorosurfactant co-injection experiment. This indicates that there was no sign of a stable foam using this surfactant and that the surfactant was unstable at high temperature and high salinity. This also caused the recovery of oil to be lower for this experiment. The pressure drop response comparison for the two co-injection experiments is shown in FIG. 13. Alternatively or additionally, visual foam tests by means of a sight glass installed at the core outlet could be conducted to visually observation of the foam formation.

Example 13

Density Measurements

To calculate the interfacial tension between any two fluids, the density of both the fluids had to be measured at the particular condition. The density of the injection brine (sea water), the surfactant solution and the oil were measured at 90° C. and five different pressures. The density meter was first calibrated at all these conditions using two fluids of known densities, i.e. nitrogen and distilled water. The values of the densities of all the fluids is tabulated in Table 18.

TABLE 18

Density values of the reference and measured fluids.

| | Density at 90° C. (g/ml) | | | | |
|---|---|---|---|---|---|
| | Reference Fluids | | Measured Fluids | | |
| Pressure (psi) | Distilled Water | Nitrogen | Sea Water | Sea Water + Fluoro | Oil |
| 500 | 0.96684 | 0.031782 | 1.00813 | 1.00708 | 0.84106 |
| 1000 | 0.968394 | 0.062914 | 1.00999 | 1.00976 | 0.84368 |
| 1800 | 0.970852 | 0.110381 | 1.01176 | 1.01124 | 0.84632 |
| 2500 | 0.972975 | 0.149604 | 1.01431 | 1.01385 | 0.85022 |
| 4000 | 0.977441 | 0.224531 | 1.01943 | 1.01822 | 0.85584 |

Figure 14:
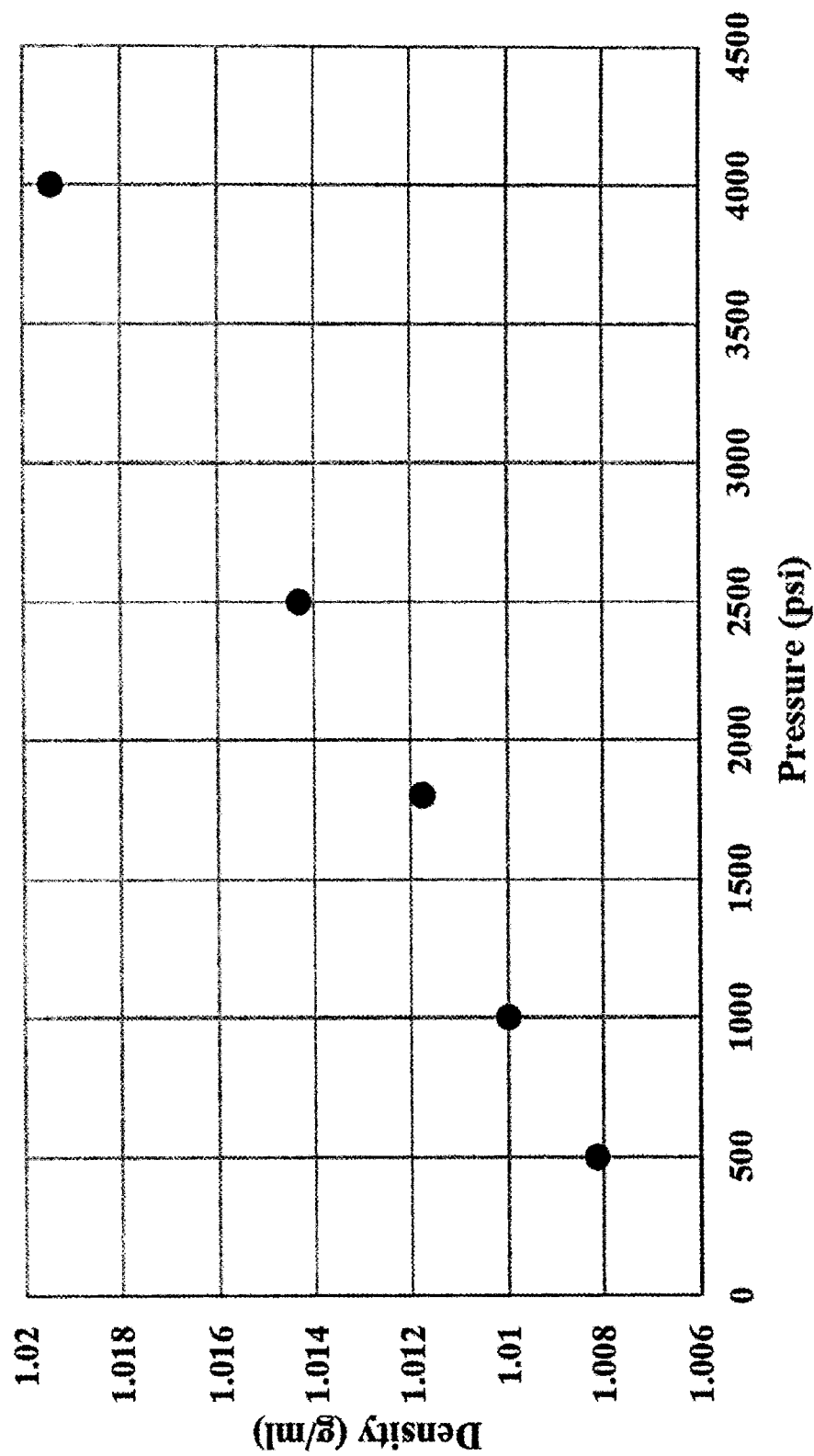
FIG. 14 illustrates the density of sea water (injection brine) at 90° C.
Figure 15:
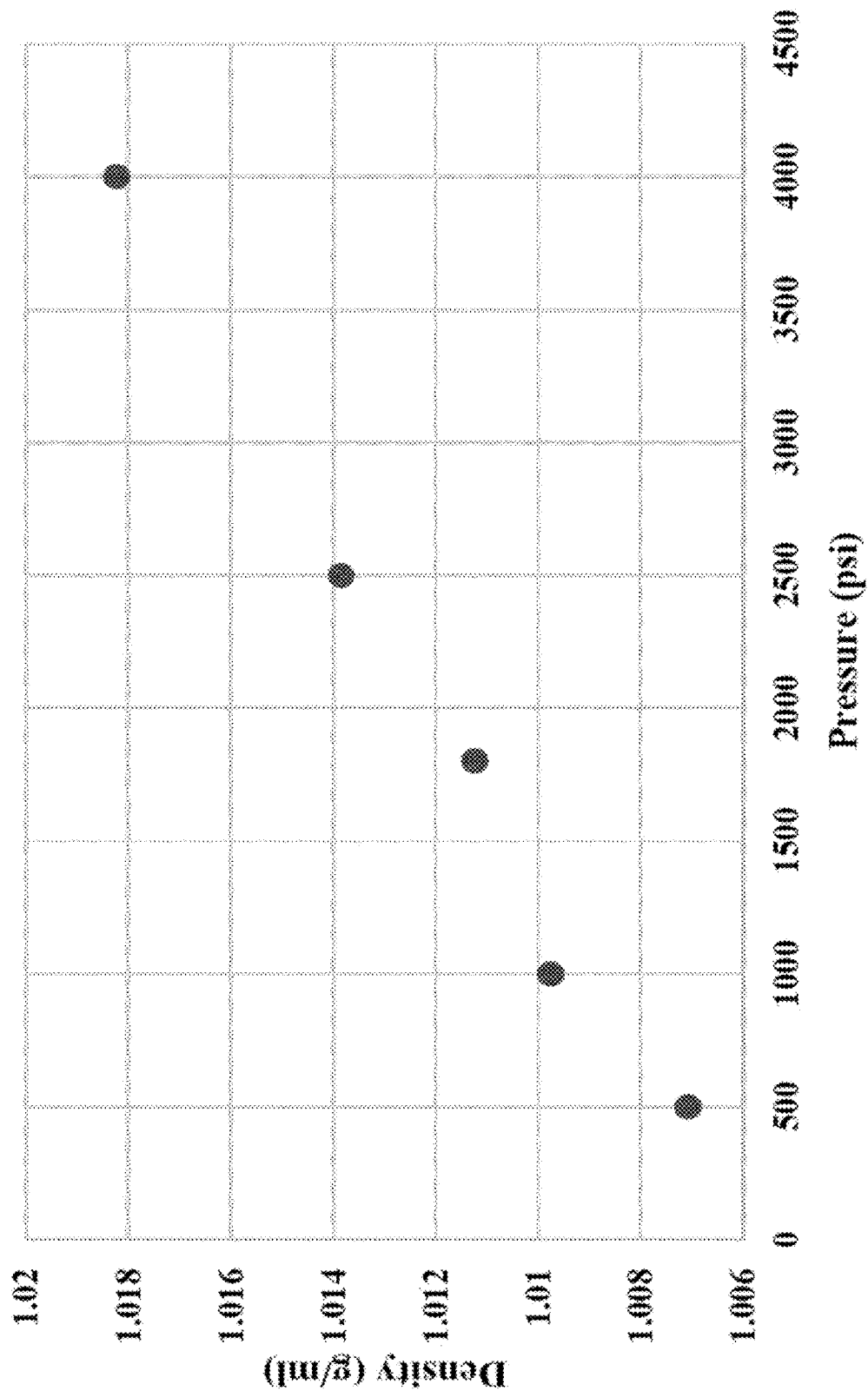
FIG. 15 illustrates the density of surfactant solution at 90° C.
Figure 16:
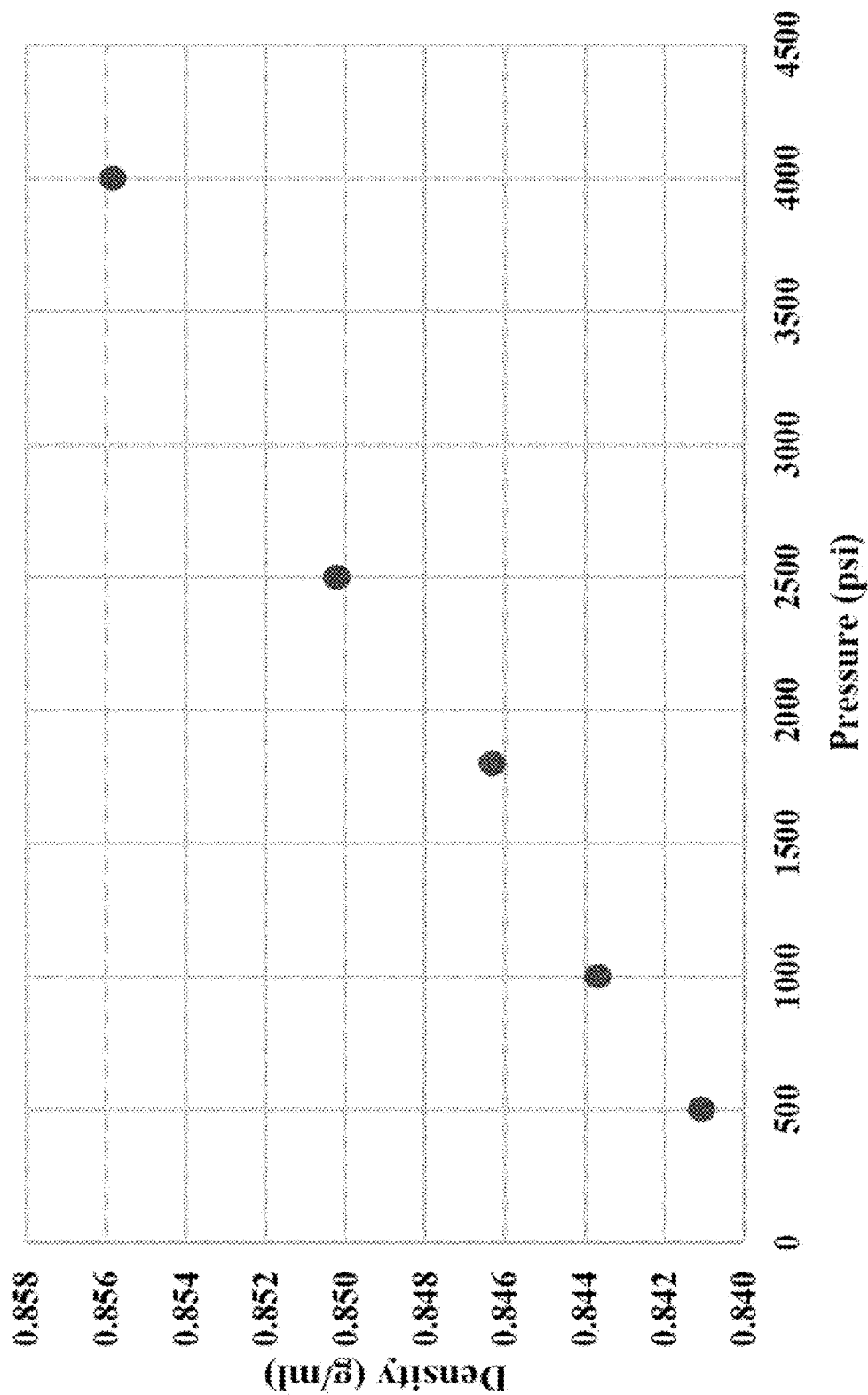
FIG. 16 illustrates the density of dead oil at 90° C.
Figure 17A:
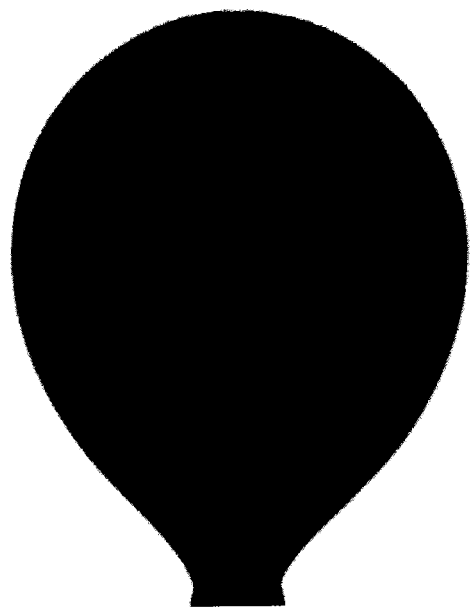
FIG. 17A shows the shape of an oil drop in sea water at 500 psi.
Figure 17B:
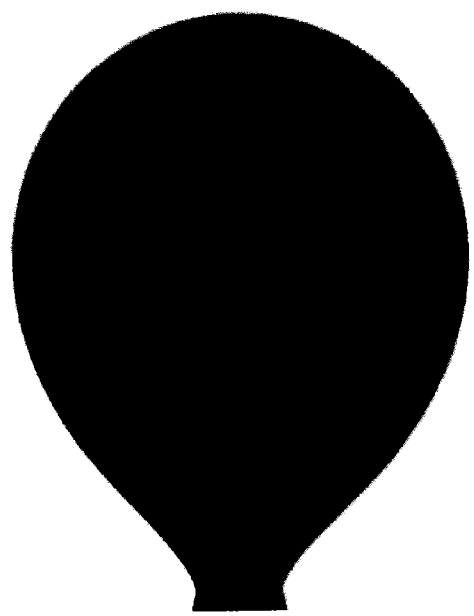
FIG. 17B shows the shape of an oil drop in sea water at 1000 psi.
Figure 17C:
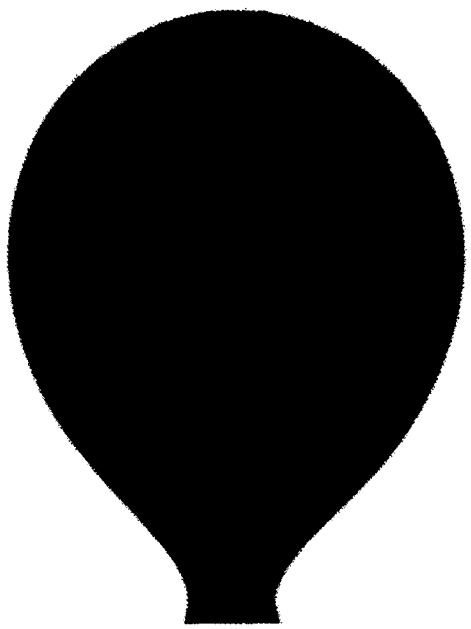
FIG. 17C shows the shape of an oil drop in sea water at 1800 psi.
Figure 17D:
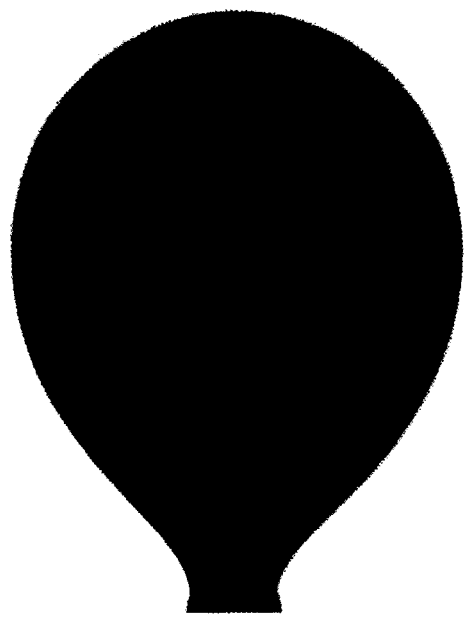
FIG. 17D shows the shape of an oil drop in sea water at 2500 psi.
Figure 17E:
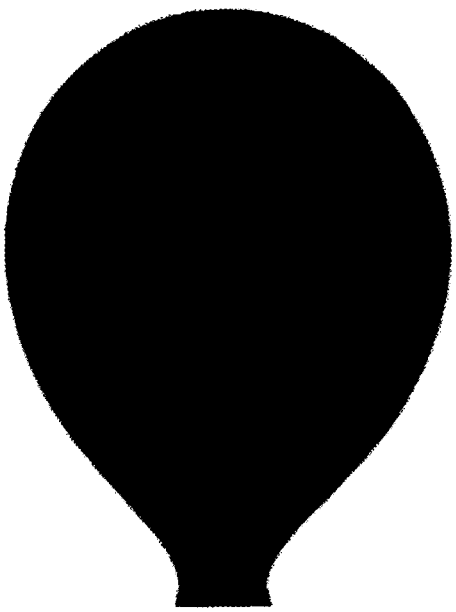
FIG. 17E shows the shape of an oil drop in sea water at 4000 psi.
Figure 18A:
FIG. 18A shows the shape of an oil drop in surfactant solution at 500 psi.
Figure 18B:
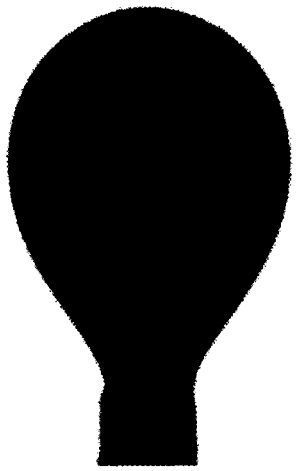
FIG. 18B shows the shape of an oil drop in surfactant solution at 1000 psi.
Figure 18C:
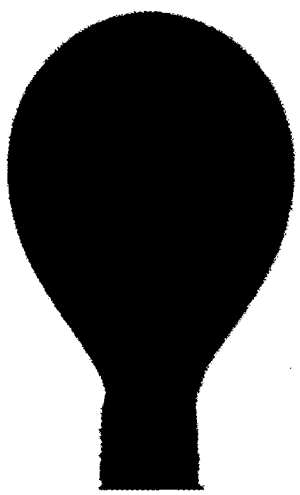
FIG. 18C shows the shape of an oil drop in surfactant solution at 1800 psi.
Figure 18D:
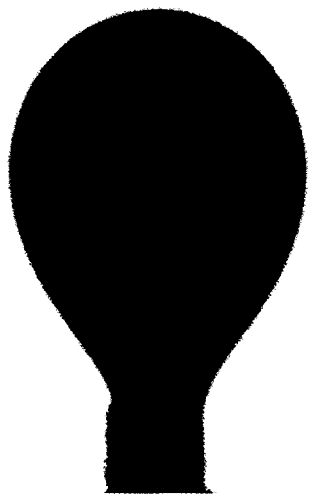
FIG. 18D shows the shape of an oil drop in surfactant solution at 2500 psi.
Figure 18E:
FIG. 18E shows the shape of an oil drop in surfactant solution at 4000 psi.

The density of all the fluids increased slightly with the pressure. The trend for each of the measured fluids is shown in FIGS. 14, 15 and 16.

Example 14

IFT Measurements

IFT measurements were done firstly between the injected brine (sea water) and the dead oil used in the core-flooding and secondly between the surfactant solution and the dead oil. Oil drop was created in the bulk fluids that were the injection brine and the surfactant solution respectively. After each drop was created, a transition period was seen in which the IFT dropped rapidly and then stabilized at a "quasi-static value". This initial time dependence of the ITT value has been observed in a number of earlier studies and is attributed to equilibration between the two fluids (Apostolos Georgiadis, Geoffrey Maitland, J. P. Martin Trusler and Alexander Bismark, 2010, "Interfacial Tension Measurements of the ($H_2O+CO2$) System at Elevated Pressures and Temperatures", J. Chem. Eng. Data 2010, 55, 4168-4175—incorporated herein by reference its entirety).

Figure 19:
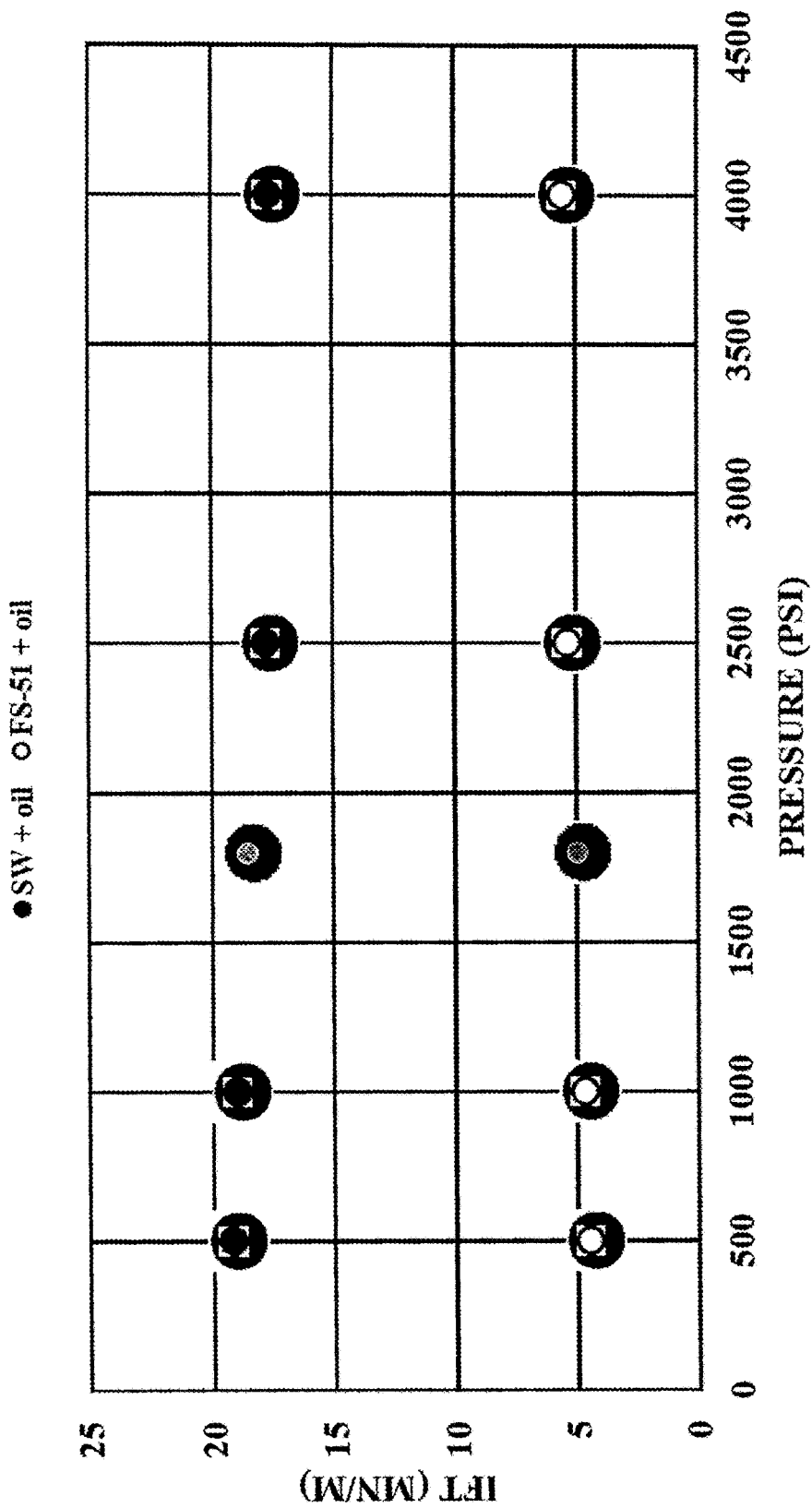
FIG. 19 illustrates the IFT trends of the sea water system and the surfactant solution system at 90° C.

Each drop was monitored for at least 600 seconds and the IFT value was measured by averaging the IFT values during the last 300 seconds for each drop. The results and images of the drops were saved every five seconds by the software on the computer attached to the IFT equipment. The images, values and trends of the IFT measurements are shown in Table 19 and the FIGS. 17A-17E, FIGS. 18A-18E and FIG. 19. In FIG. 19, the grey points indicate the core-flooding experiment condition.

TABLE 19

IFT measurements.
IFT (mN/m)

| Pressure | SW + Oil | 0.15% Fluoro in SW + oil |
|---|---|---|
| 500 | 19.22 | 4.49 |
| 1000 | 19.01 | 4.68 |
| 1800 | 18.54 | 4.96 |
| 2500 | 17.8 | 5.36 |
| 4000 | 17.7 | 5.56 |

Example 15

Surfactant Contribution in IFT Reduction

Regardless of the pressure drop across the core and the generation of foam, the increase in oil recovery during the surfactant solution injection was evident in all the experiments. This may be due to the reduction in interfacial tension caused by the presence of surfactant which reduces the capillary forces making the oil movable (R. Farajzadeh, A. Andrianov, and P. L. J. Zitha, 2009, "Foam assisted oil recovery at miscible and immiscible conditions", SPE 126410; Seyed Amir Farzaneh, Mehran Sohrabi, 2013, "A Review of the Status of Foam Application in Enhanced Oil Recovery", SPE-164917-MS—each incorporated herein by reference in its entirety). To ascertain this phenomena, IFT tests were conducted at high temperature and pressure, including the condition at which the core-flooding experiments were performed. IFT measurements were done firstly between the injected brine (sea-water) and the dead oil used in the core-flooding and secondly between the surfactant solution and the dead oil. The surfactant solution was made using the fluoro-surfactant with 0.15% (vol.) concentration in the injection brine (sea water). This was the same surfactant solution that was used in the earlier core-flooding experiments. Results showed that there was significant reduction in the IFT due to the addition of the fluoro-surfactant even at this very low concentration. This also established the fact that this surfactant is stable at high temperature and high salinity.

Example 16

Effect of Pressure on IFT

Figure 20:
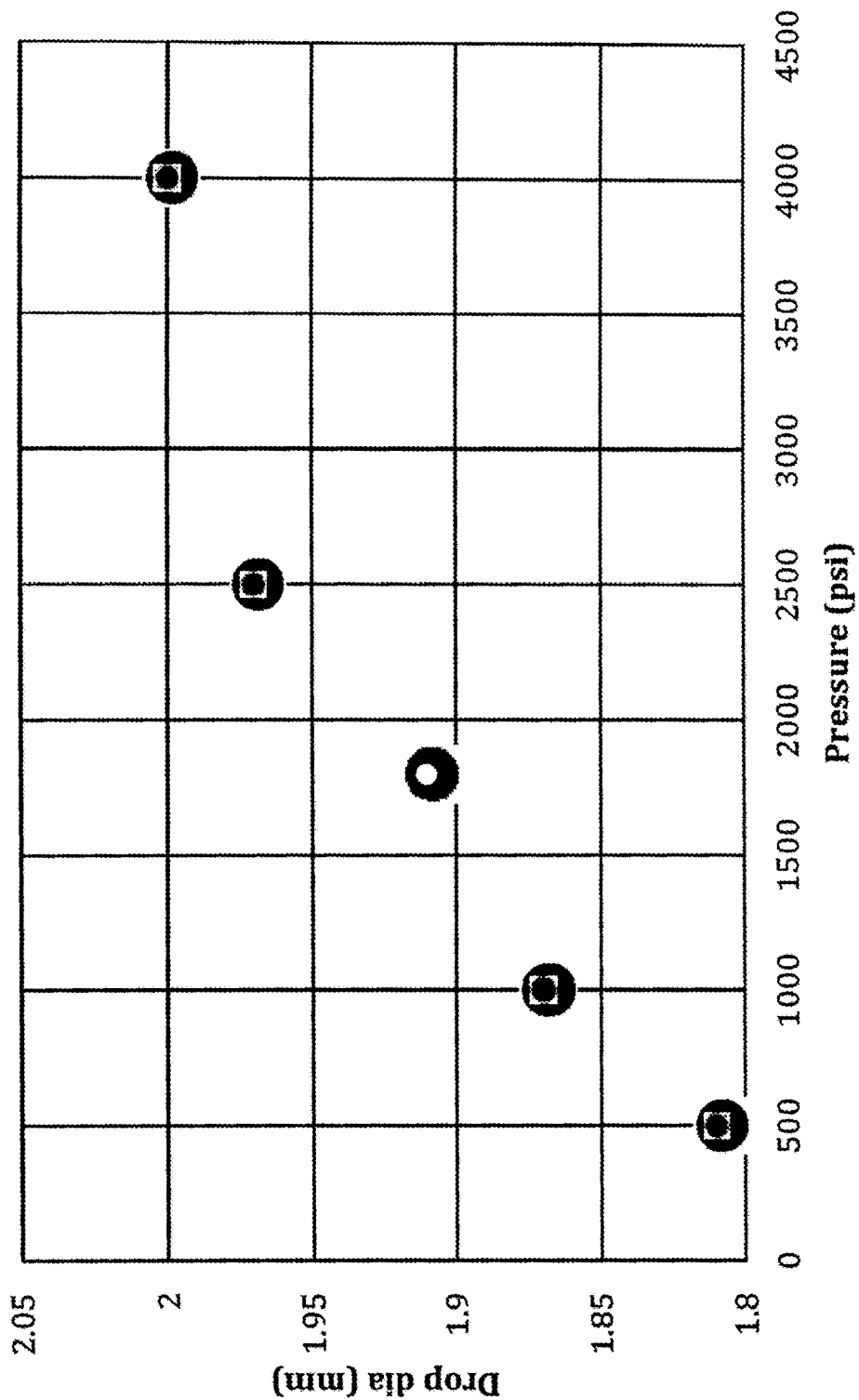
FIG. 20 shows the drop diameter of oil in the surfactant solution during IFT measurements at 90° C.

The effect of pressure on the IFT measurements was evident in the values obtained. As the pressure increased, the IFT values increased slightly for the surfactant solution and oil combination. This shows that at higher pressures, the surfactant performance decreases slightly and the highest value of the IFT (5.56 mN/m) for this combination was obtained at the highest measured pressure (4000 psi). The increase in IFT meant that the drop was more stable and this was evident as the drop diameter and volume increased slightly with increase in pressure. The values of the drop diameter with pressure for the fluorosurfactant-oil combination are tabulated in Table 20 and plotted in FIG. 20. In FIG. 20, the white point indicates the core-flooding experiment condition.

TABLE 20

Drop diameter of oil in surfactant solution during IFT measurements.
Fluoro + oil

| Pressure (psi) | Drop diameter (mm) |
|---|---|
| 500 | 1.81 |
| 1000 | 1.87 |
| 1800 | 1.91 |
| 2500 | 1.97 |
| 4000 | 2 |

Example 17

Computer Systems and Hardware Components Thereof

Figure 21:
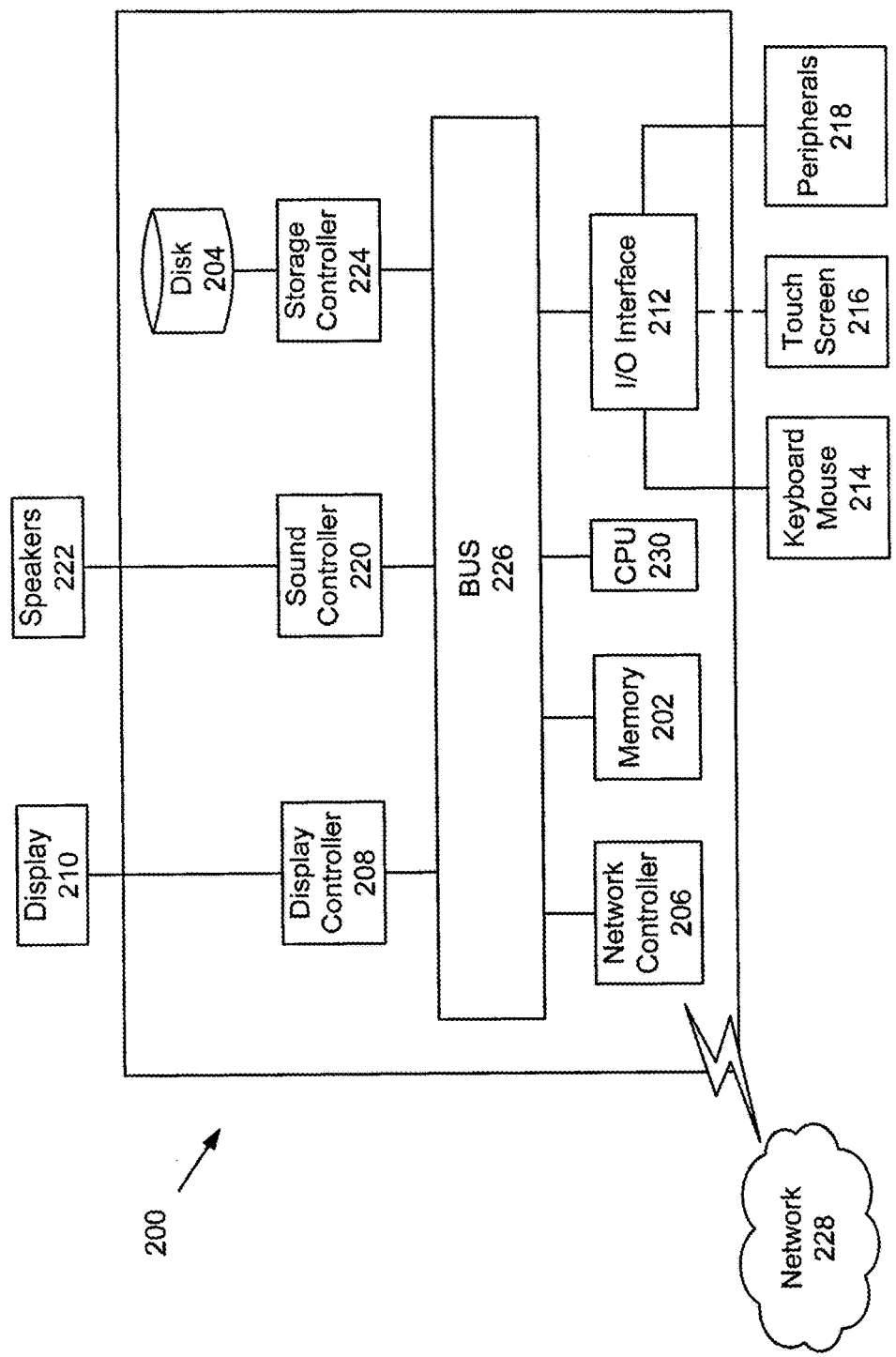
FIG. 21 is a block diagram of an exemplary computer system through which a core-flooding system, positive displacement Quizix pumps, CT scanner, IFT equipment and other devices can be controlled.

Next, a hardware description of one or more computer systems through which the core-flooding system, positive displacement Quizix pumps, CT scanner, IFT equipment and other devices used in in the present disclosure can be controlled, is provided with reference to FIG. 21. In FIG. 21, the computer system 200 includes a CPU 230 which performs the processes described above. The process data and instructions may be stored in memory 202. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer system 200 communicates, such as a server or computer.

Further, the claimed advancements may be provided as a utility application, background daemon, or component of an operating system, or combination thereof, executing in conjunction with CPU 230 and an operating system such as Microsoft Windows 7, UNIX, Solaris, LINUX, Apple MAC-OS and other systems known to those skilled in the art.

CPU 230 may be a Xenon or Core processor from Intel of America or an Opteron processor from AMD of America, or may be other processor types that would be recognized by one of ordinary skill in the art. Alternatively, the CPU 230 may be implemented on an FPGA, ASIC, PLD or using discrete logic circuits, as one of ordinary skill in the art would recognize. Further, CPU 230 may be implemented as multiple processors cooperatively working in parallel to perform the instructions of the inventive processes described above.

The computer system 200 in FIG. 2 also includes a network controller 206, such as an Intel Ethernet PRO network interface card from Intel Corporation of America, for interfacing with network 228. As can be appreciated, the network 228 can be a public network, such as the Internet, or a private network such as an LAN or WAN network, or any combination thereof and can also include PSTN or ISDN sub-networks. The network 228 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer system 200 further includes a display controller 208, such as a NVIDIA GeForce GTX or Quadro graphics adaptor from NVIDIA Corporation of America for interfacing with display 210, such as a Hewlett Packard HPL2445w LCD monitor. A general purpose I/O interface 212 interfaces with a keyboard and/or mouse 214 as well as a touch screen panel 216 on or separate from display 210. General purpose I/O interface also connects to a variety of peripherals 218 including printers and scanners, such as an OfficeJet or DeskJet from Hewlett Packard.

A sound controller 220 is also provided in the computer system 220, such as Sound Blaster X-Fi Titanium from Creative, to interface with speakers/microphone 222 thereby providing sounds and/or music.

The general purpose storage controller 224 connects the storage medium disk 204 with communication bus 226, which may be an ISA, EISA, VESA, PCI, or similar, for interconnecting all of the components of the computer system 200. A description of the general features and functionality of the display 210, keyboard and/or mouse 214, as well as the display controller 208, storage controller 224, network controller 206, sound controller 220, and general purpose I/O interface 212 is omitted herein for brevity as these features are known.

The dissertation entitled "Performance of Fluoro-Surfactant with Supercritical $CO_2$ Flooding in High Salinity Carbonate Reservoirs" by Zaid Zaffar Jangda is incorporated herein by reference in its entirety.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A process for recovering hydrocarbons from a carbonate reservoir, comprising:
    injecting the carbonate reservoir with a first solution and thereafter recovering a first amount of the hydrocarbons; and
    injecting the carbonate reservoir with a second solution and a third solution, thereby reducing the viscosity of a second amount of the hydrocarbons and displacing the second amount of the hydrocarbons from the carbonate reservoir, and thereafter recovering the second amount of the hydrocarbons;
    wherein:
    the carbonate reservoir has a connate water salinity greater than 200,000 ppm;
    the first solution is an aqueous solution having a salinity of 20,000 ppm to 200,000 ppm;
    the second solution is an aqueous solution having a salinity of 20,000 ppm to 200,000 ppm and comprises 0.05-0.3 vol. % of a fluorosurfactant;
    the third solution comprises supercritical $CO_2$;
    a volume ratio of the second solution to the third solution is in a range of 3:1 to 9:1; and
    wherein the injecting with the second solution and the third solution provides at least 15% incremental oil recovery after the injecting with the first solution.

2. The process of claim 1, wherein the first solution is natural sea water having a salinity of from 55,000 to 60,000 ppm.

3. The process of claim 1, wherein the second solution is an aqueous solution having a fluorosurfactant concentration of 0.1 to 0.2 vol. % and a salinity of 55,000 to 60,000 ppm.

4. The process of claim 1, wherein the fluorosurfactant is amphoteric and comprises a hydrophobic chain having no more than 12 carbon atoms.

5. The process of claim 1, wherein the second solution consists essentially of brine and the fluorosurfactant.

6. The process of claim 1, wherein the third solution has a supercritical $CO_2$ concentration of at least 70 vol. % and a salinity of no higher than 1000 ppm.

7. The process of claim 1, wherein the second solution and the third solution are injected alternately in a plurality of cycles, each cycle comprising one discontinuous fluorosurfactant slug and one discontinuous supercritical $CO_2$ slug, each discontinuous slug comprising 0.1 to 2.5 pore volumes of the second solution or the third solution.

8. The process of claim 1, wherein the viscosity of the oil is reduced by 65-80%.

9. The process of claim 1, recovering at least 50% of the original oil in place in the carbonate reservoir.

10. The process of claim 1, wherein the injecting with the second solution and the third solution recovers at least 30% of the oil left in the carbonate reservoir after the injecting with the first solution.

11. The process of claim 1, wherein at least 50% of the original oil in place in the carbonate reservoir is recovered with less than 3 pore volumes.

* * * * *